US006188833B1

(12) United States Patent
Makino et al.

(10) Patent No.: US 6,188,833 B1
(45) Date of Patent: *Feb. 13, 2001

(54) IMAGE INFORMATION RECORDING AND REPRODUCING SYSTEM WITH ASPECT RATION DISCRIMINATION

(75) Inventors: Jun Makino; Koji Takahashi, both of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/317,848

(22) Filed: Oct. 4, 1994

Related U.S. Application Data

(63) Continuation of application No. 07/860,428, filed on Mar. 30, 1992, now abandoned.

(30) Foreign Application Priority Data

Apr. 3, 1991 (JP) .................................................. 3-071052
Jun. 13, 1991 (JP) .................................................. 3-141924

(51) Int. Cl.[7] ............................... H04N 5/76; H04N 5/92
(52) U.S. Cl. ............................ 386/95; 386/117; 386/131
(58) Field of Search .................................... 358/335, 310, 358/342, 909.1, 906, 343; 348/445, 441, 207; 359/668, 669, 670, 710; 352/69, 92; 360/19.1; 386/1, 39, 45, 95, 96–106, 117, 131; H04N 5/76, 5/78, 5/781, 5/782, 9/79, 5/225, 11/20, 11/06, 7/07, 7/04, 5/92

(56) References Cited

U.S. PATENT DOCUMENTS

| 3,551,029 | * | 12/1970 | Kirchhoff | 359/669 |
| 4,575,772 | * | 3/1986 | Shimada et al. | 358/343 |
| 4,681,405 | * | 7/1987 | Balogh et al. | 350/420 |
| 4,872,747 | * | 10/1989 | Jalkio et al. | 359/669 |
| 4,947,250 | * | 8/1990 | Henderson | 358/12 |
| 5,032,927 | * | 7/1991 | Watanabe et al. | 358/335 |
| 5,122,885 | * | 6/1992 | Yoshioka et al. | 358/310 |
| 5,184,880 | * | 2/1993 | Lisziewicz | 359/668 |
| 5,504,536 | * | 4/1996 | Yatomi et al. | 348/565 |

FOREIGN PATENT DOCUMENTS

| 0411440 | * | 2/1991 | (EP) | H04N/5/92 |
| 2140242 | * | 11/1984 | (GB) | 358/310 |
| 2170790 | * | 7/1990 | (JP) | H04N/9/80 |

* cited by examiner

Primary Examiner—Thai Tran
(74) Attorney, Agent, or Firm—Robin, Blecker & Daley

(57) ABSTRACT

An image information processing system comprises a recording apparatus for recording an image having an arbitrary aspect ratio on a recording medium in the form of an image signal, and a reproducing apparatus for reading out the image signal from the recording medium, processing the image signal to form an image having an appropriate aspect ratio, and reproducing the image. The recording apparatus performs compression or expansion on the image having the arbitrary aspect ratio to convert the image into an image having a predetermined aspect ratio, and records the image having the predetermined aspect ratio in the form of the image signal. The recording apparatus also performs recording of compression/expansion information associated with the compression or the expansion. The reproducing apparatus reproduces an image having an aspect ratio equal to the aforesaid arbitrary aspect ratio from the image signal on the basis of the compression/expansion information.

24 Claims, 19 Drawing Sheets

FIG.15(a)   γ = 1.33 TIMES
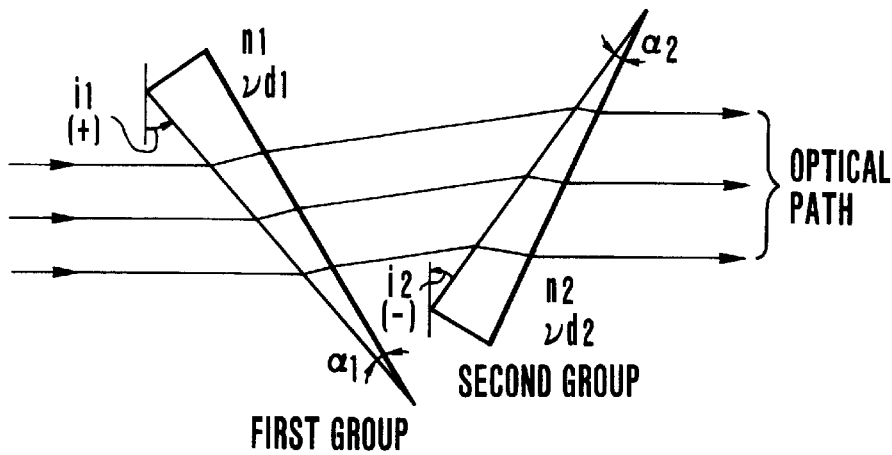
FIG.15(b)   γ = 1.00 TIME
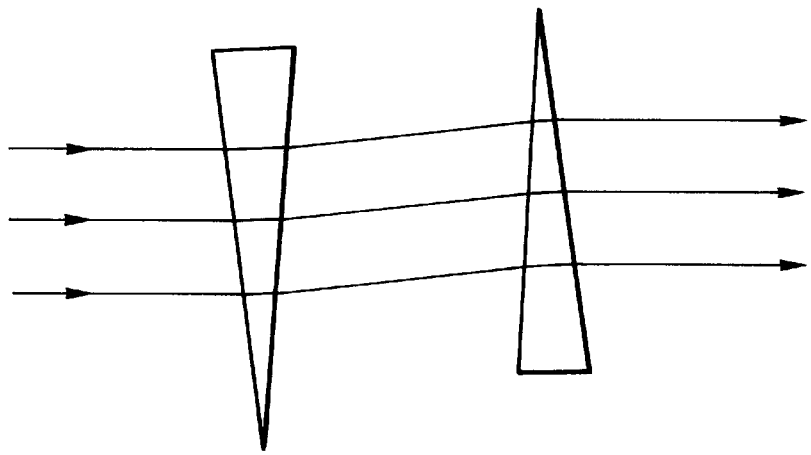
FIG.15(c)   γ = 0.75 TIMES
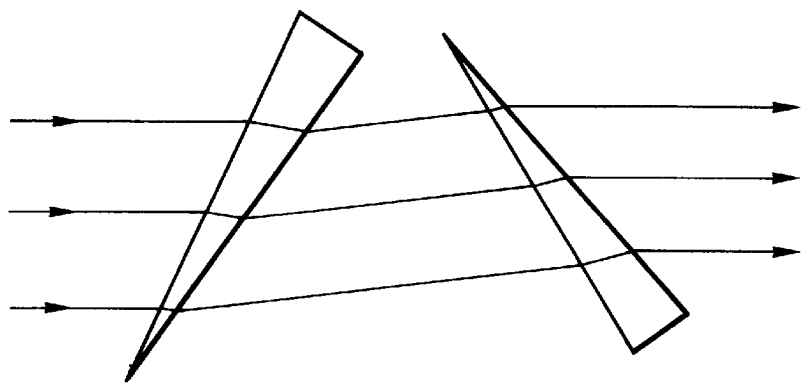

FIG.17(a)    γ = 1.33 TIMES
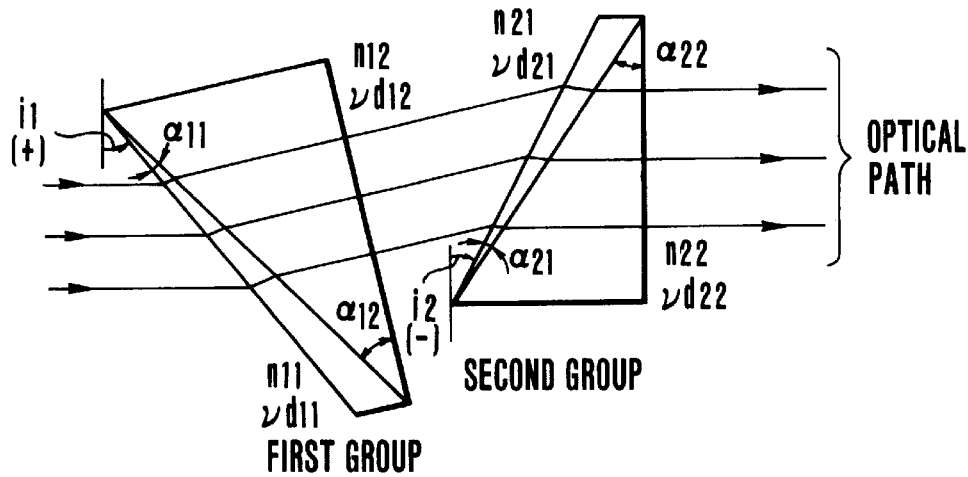
FIG.17(b)    γ = 1.00 TIME
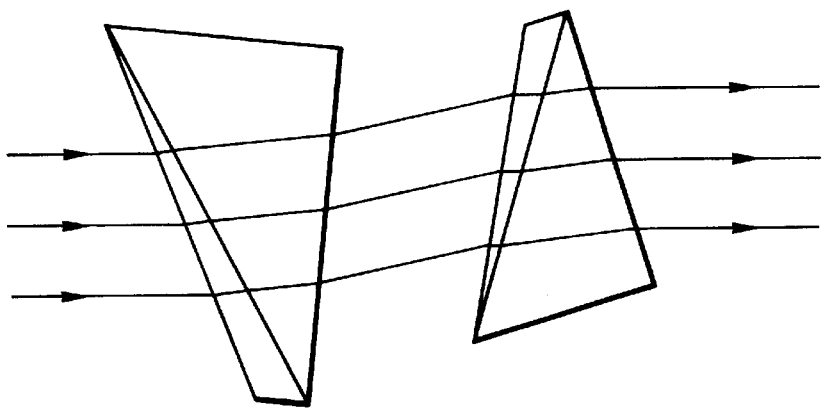
FIG.17(c)    γ = 0.75 TIMES
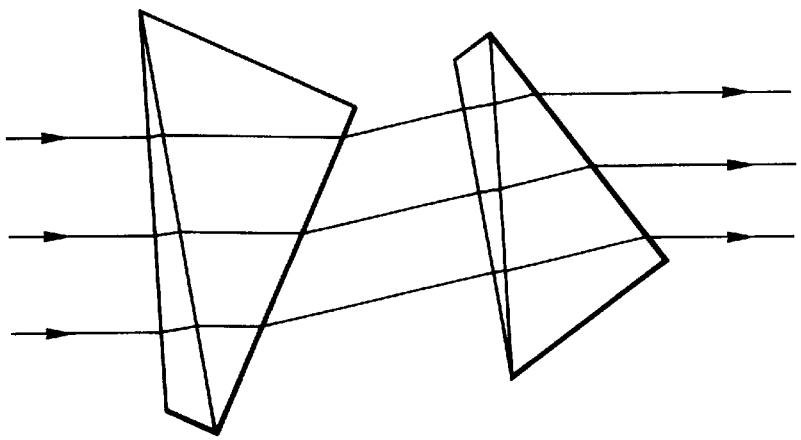

FIG. 19(a) γ = 1.33 TIMES
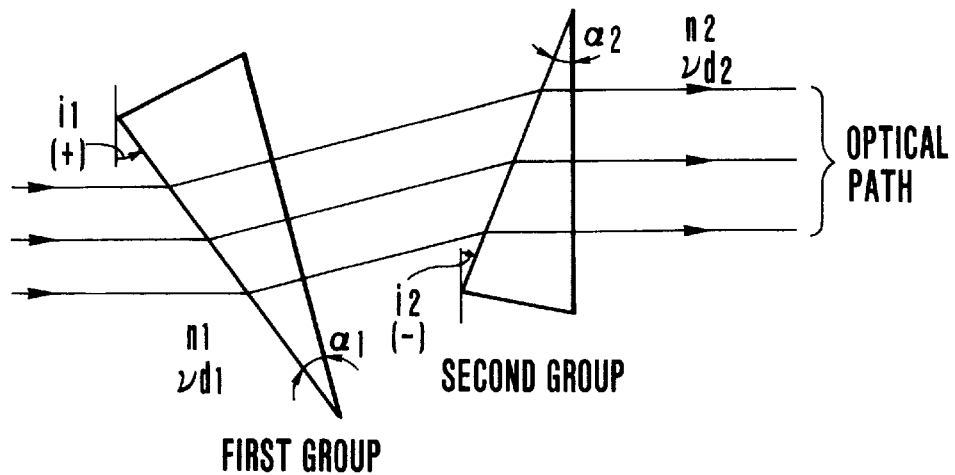
FIG. 19(b) γ = 1.00 TIME
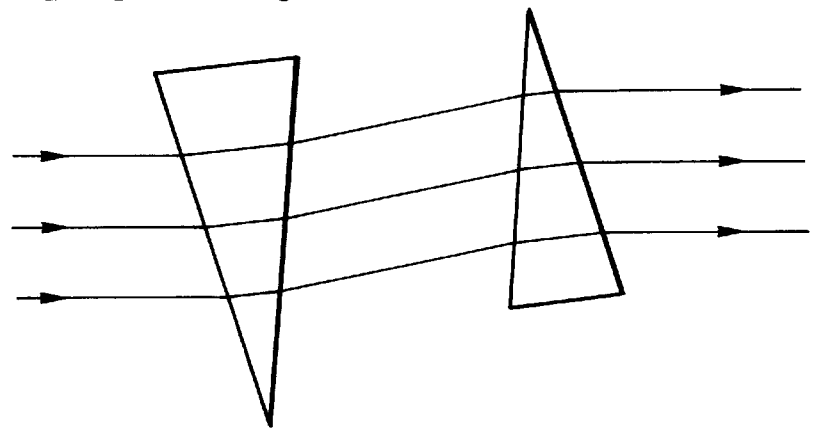
FIG. 19(c) γ = 0.75 TIMES
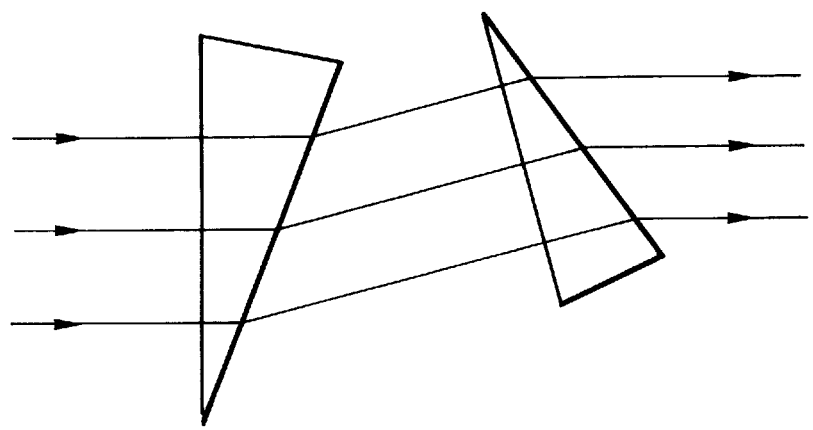

IMAGE INFORMATION RECORDING AND REPRODUCING SYSTEM WITH ASPECT RATION DISCRIMINATION

This is a continuation application under 37 CFR 1.62 of prior application Ser. No. 07/860,428, filed Mar. 30, 1992, now abandoned.

BACKGROUND OF THE INVENTION

1. Field of the Invention

The present invention relates to an image information processing apparatus and an image information processing system and, more particularly, to conversion of the aspect ratio of an image. In such conversion, during recording, the aspect ratio of image information to be recorded and reproduced is compressed or expanded through optical means and the resultant image having a different aspect ratio is recorded, and during reproduction, the different aspect ratio is converted into the original aspect ratio.

2. Description of the Related Art

In general, the aspect ratio of an image carried by a television video signal which is transmitted according to a conventional television system (for example, the NTSC system) is 4:3, and this 4:3 aspect ratio is widely adopted in the field of standard television systems.

In recent years, the image quality of a television signal has been further improved and the size of a screen has become larger and larger. However, since the television video signal itself still conforms to such a standard television system, the aspect ratio of an image remains the conventional 4:3.

As is known to those skilled in the art, if an image is to be displayed on a large screen of 100 inches or above, such as the projection screen of a projection display apparatus (hereinafter referred to as the "projector"), it is desirable to adopt a screen wider than a screen having the conventional 4:3 aspect ratio (for example, a screen having an aspect ratio of 16:9) if the visual characteristics of human beings are taken into account.

On the basis of the above-described concept, in the field of high-definition television systems or other similar systems which can handle high-quality images, a system has been proposed which employs an enlarged screen and which enables an image to be photographed and/or displayed at the 16:9 aspect ratio or another aspect ratio which is different from the conventional 4:3 aspect ratio.

However, in such a high-definition television system which greatly differs from the existing standard television system, to attain a wide screen, it is necessary to employ exclusive apparatuses for recording and reproduction, respectively. This arrangement compels users to pay great expenses.

If an image of different aspect ratio is to be recorded and/or reproduced by mean s of an apparatus conforming to the existing standard television system, only a portion of the effective screen of an image sensor or a reproducing apparatus is utilized and the number of effective pixels per image is reduced. This reduction in the number of effective pixels is undesirable in that the degradation of image quality is involved.

To cope with the above problems, an apparatus is proposed which utilizes a linear compression optical system (anamorphic lens) to achieve a wide screen while making the best use of a conventional apparatus without reducing the number of effective pixels. In such an apparatus, during photography, the aspect ratio of an image is optically converted by means of one anamorphic lens and the resultant image having a different aspect ratio is recorded. During reproduction, another anamorphic lens having substantially identical characteristics is employed to convert optically the different aspect ratio into the original aspect ratio, thereby reproducing the original image. For example, Japanese Laid-Open Patent Application No. Hei 2-170790 discloses a magnetic image-information recording and reproducing apparatus provided with a plurality of anamorphic lenses and arranged to record an image and a plurality of kinds of detection codes for discrimination between image compression ratios in a control track on a video tape which is a recording medium for recording of the image. During reproduction, an anamorphic lens used for recording is replaced with a different anamorphic lens on the basis of the detection code and the image is reproduced by means of the different anamorphic lens.

However, the ratio at which such an apparatus converts the aspect ratio of an image is fixed.

In other words, in the case of a system which records an image having an aspect ratio of 16:9 and reproduces it as a display image having the 16:9 aspect ratio by means of an apparatus capable of recording and reproducing an image having the conventional 4:3 aspect ratio, if an image having an aspect ratio of 2:1 is to be recorded and reproduced by means of such a system, it is necessary to replace a converting optical system exclusive for recording with that exclusive for reproduction. This replacement is extremely time-consuming.

SUMMARY OF THE INVENTION

It is, therefore, an object of the present invention to provide an image information processing apparatus and an image information processing system each of which makes it possible to solve the problems of the aforesaid conventional recording and reproducing apparatus, and which can record an image having an arbitrary aspect ratio as an image of different aspect ratio by means of a recording apparatus conforming to a standard television system and also which can automatically restore the different aspect ratio to an appropriate aspect ratio without an erroneous operation.

To achieve the above object, in accordance with one aspect of the present invention, there is provided an image information processing apparatus which comprises converting means for performing compression or expansion on an image having an arbitrary aspect ratio and converting the image into an image having a predetermined aspect ratio, image sensing means for generating an image signal associated with the image outputted from the converting means, identifying means for identifying a ratio of the compression or a ratio of the expansion, discrimination signal generating means for generating a discrimination signal associated with the ratio of the compression or the ratio of the expansion from an output of the identifying means, and recording means for recording the discrimination signal on a recording medium together with the image signal.

In accordance with a further aspect of the present invention, there is provided an image information processing system which comprises a recording apparatus for recording an image having an arbitrary aspect ratio on a recording medium in the form of an image signal, and a reproducing apparatus for reading out the image signal from the recording medium, processing the image signal to form an image having an appropriate aspect ratio, and reproducing the image. The recording apparatus performs compression or expansion on the image having the arbitrary aspect ratio to convert the image into an image having a predetermined aspect ratio, and records the image having the predetermined aspect ratio in the form of the image signal. The recording apparatus also performs recording of compression/expansion information associated with the compression or the expansion. The reproducing apparatus reproduces an image having an aspect ratio equal to the aforesaid arbitrary aspect ratio from the image signal on the basis of the compression/expansion information.

Other objects and advantages of the invention will become apparent from the following detailed description taken in conjunction with the accompanying drawings.

BRIEF DESCRIPTION OF THE DRAWINGS

FIGS. 15(a), 15(b) and 15(c) are schematic, vertical sectional views of a prism optical system according to the sixth embodiment of the present invention;

FIGS. 17(a), 17(b) and 17(c) are schematic, vertical sectional views of a prism optical system according to the seventh embodiment of the present invention;

FIGS. 19(a), 19(b) and 19(c) are schematic, horizontal sectional views of a prism optical system according to the eighth embodiment of the present invention;

DETAILED DESCRIPTION OF THE PREFERRED EMBODIMENTS

A first embodiment of the present invention will be described below in detail with reference to FIGS. 1 to 4.

Figure 1:
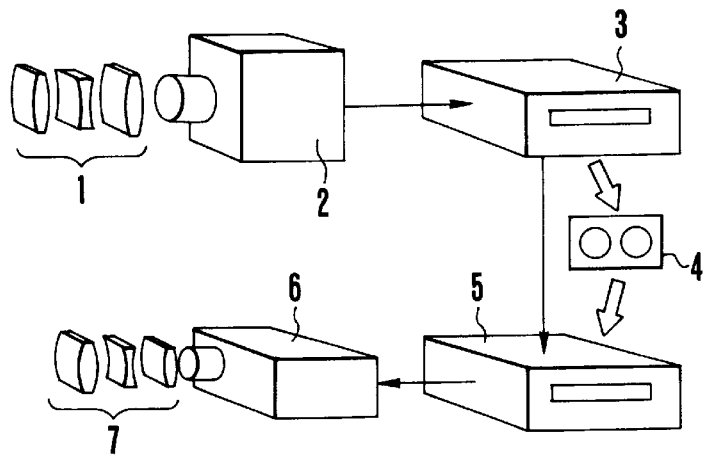
FIG. 1 is a schematic view showing the entire apparatus arrangement according to each of first to fifth embodiments of the present invention.

FIG. 1 is a schematic view showing the entire apparatus arrangement according to the first embodiment of the present invention as well as according to each of second to fifth embodiments which will be described later.

Referring to FIG. 1, a photographic cylinder lens system 1 is constructed as a lens system which is operative while keeping its afocal state. The photographic cylinder lens system 1 is also arranged so that its individual lenses can be driven to change the spacings therebetween by lens-driving means (not shown), thereby varying, while keeping the afocal state, the magnification of an image to be photographed, along either one of the frame width and the frame height of the image.

The photographic cylinder lens system 1 is attached to the front of a photographic lens of a television camera 2.

The television camera 2 is of a type which conforms to an existing standard television system (for example, the NTSC system). In the television camera 2, an image, which is formed on the photoelectric conversion surface of an image sensing device such as an image pickup tube or a CCD by the photographic lens, is photoelectrically converted and is then converted into a standardized video signal through predetermined signal processing.

A magnetic recording apparatus 3 is also of a type which conforms to the existing standard television system. In the magnetic recording apparatus 3, the image information provided by the television camera 2 is recorded on a magnetic recording medium such as a magnetic tape.

The magnetic recording medium such as a magnetic tape on which the image information is to be recorded is indicated by reference numeral 4.

A magnetic reproducing apparatus 5 is also of a type which conforms to the existing standard television system, and reproduces the image information recorded on the magnetic recording medium 4 and converts it into a video signal.

A video projector 6 converts the video signal reproduced by the magnetic reproducing apparatus 5 into a visual image, displays the visual image on a display element such as a liquid-crystal display or a high-brightness Braun tube, and projects the image onto a screen by means of a projection lens.

A projecting cylinder lens system 7 is arranged to have characteristics similar to those of the photographic cylinder lens system 1. The projecting cylinder lens system 7 is also arranged so that its individual lenses can be driven to change the spacings therebetween by lens-driving means (not shown), thereby varying the magnification of the image to be projected, along either one of the frame width and the frame height of the image, so as to project an image substantially equivalent to the photographed image. Thus, the original image is reproduced.

The projecting cylinder lens system 7 is attached to the front of a projecting lens of the video projector 6.

In the above description which has been made in connection with FIG. 1, the television camera 2, the magnetic recording apparatus 3, the magnetic reproducing apparatus 5, and the video projector 6 are referred to as independent apparatuses for the purpose of illustration only. For example, the magnetic recording apparatus 3 and the magnetic reproducing apparatus 5 may be replaced with an integrated magnetic recording and reproducing apparatus, or the television camera 2, the magnetic recording apparatus 3 and the magnetic reproducing apparatus 5 may be replaced with a video apparatus in which a video camera is integrated with a magnetic recording and reproducing apparatus. Otherwise, the video projector 6 and the apparatuses 3 and 5 may be replaced with a video apparatus in which a video projector is integrated with a magnetic recording and reproducing apparatus.

Another arrangement may also be adopted in which an image signal which will be described later is transmitted from the television camera 2 to the video projector 6 so that a photographed image may be reproduced.

Control for processing image information will be described below in detail with reference to FIG. 2.

Figure 2:
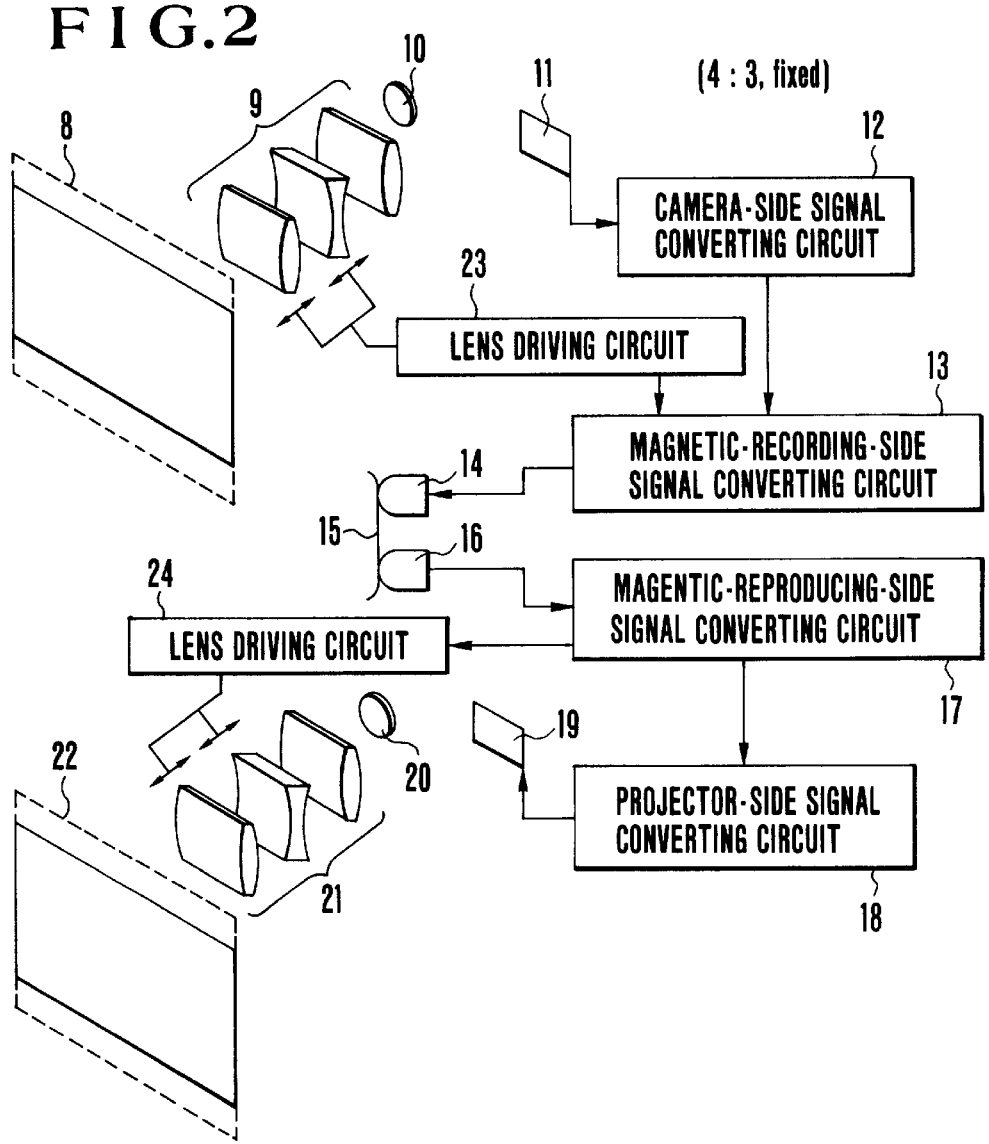
FIG. 2 is a schematic view which serves to illustrate a control operation for processing image information according to the first embodiment of the present invention.

In FIG. 2, reference numeral 8 denotes the angular field of view of an image to be photographed (hereinafter referred to as the "subject"). An image of the subject 8 is passed through a photographic cylinder lens system 9 which is capable of varying the magnification of an image to be photographed, along either one of the frame width and the frame height of the image, and is formed on an image sensor 11 in a television camera by a photographic lens 10.

The television camera itself is of a type which conforms to the existing television system, and the aspect ratio of the image sensor 11 is fixed to 4:3.

In the first embodiment, the photographic cylinder lens system 9 is constructed to produce power in a vertical direction (along the frame height). A motor for varying the spacings between the respective lenses which constitute the photographic cylinder lens system 9 is driven in accordance with a drive signal supplied from a lens driving circuit 23, whereby it is possible to enlarge (or reduce) the angular field of view of an incident image to an arbitrary magnification in the vertical direction (along the frame height).

In other words, it is possible to vary continuously the angular field of view of the image of the subject 8 in the vertical direction (along the frame height) by means of the photographic cylinder lens system 9 without varying such an angular field of view in the horizontal direction (along the frame width).

The photographic cylinder lens system 9 itself may be provided with the lens driving circuit 23, or the lens driving circuit 23 may also be provided in the television camera or a magnetic recording apparatus.

In the above-described arrangement, it is possible to vary continuously the aspect ratio of the image of the subject 8 to be recorded even if the aspect ratio of the image sensor 11 itself is constant (fixed).

In addition, it is possible to form the image of the subject 8 on the image sensor 11 while fully utilizing the effective pixels thereof.

The image which has been photoelectrically converted by the image sensor 11 is converted into a video signal by a signal converting circuit 12 in the television camera.

In the signal converting circuit 12, separation of the image signal into a luminance signal (Y signal) and a chrominance signal (C signal) is carried out if the image signal is, for example, an ordinary television signal.

The luminance signal (Y signal) and the chrominance signal (C signal) is inputted into a signal converting circuit 13 in the magnetic recording apparatus. The signal converting circuit 13 subjects the input signals to the conversion required for magnetic recording, and a magnetic recording head 14 records the resultant signals on a magnetic tape 15 which is a magnetic recording medium.

The conversion of the input signals that is required for magnetic recording is as follows: for example, in a magnetic recording apparatus of a very popular color down-converting type, each of the Y and C signals has been subjected to predetermined signal processing, and the Y signal is converted into a frequency-modulated signal, while the C signal is converted into a frequency-modulated signal of frequency lower than that of the frequency-modulated Y signal. The frequency-modulated signals thus obtained are recorded on the magnetic tape 15.

The aspect ratio of the image of the subject 8 whose aspect ratio has been varied by the photographic cylinder lens system 9 is obtained from an output of an encoder (not shown) by the lens driving circuit 23 as a value corresponding to the amount of movement of each lens in the photographic cylinder lens system 9.

The obtained value is transmitted as aspect-ratio information (magnification information) on the image, that is, compression-ratio information on the image, to the magnetic-recording-side signal converting circuit 13 in which the value is recorded on the magnetic tape 15 together with image information.

A method of recording the magnification information about the aspect ratio on the magnetic tape 15 is to convert the magnification information into a signal format which can be combined with the video signal, combine the resultant signal with the video signal, and record the combined signal.

Figure 3:
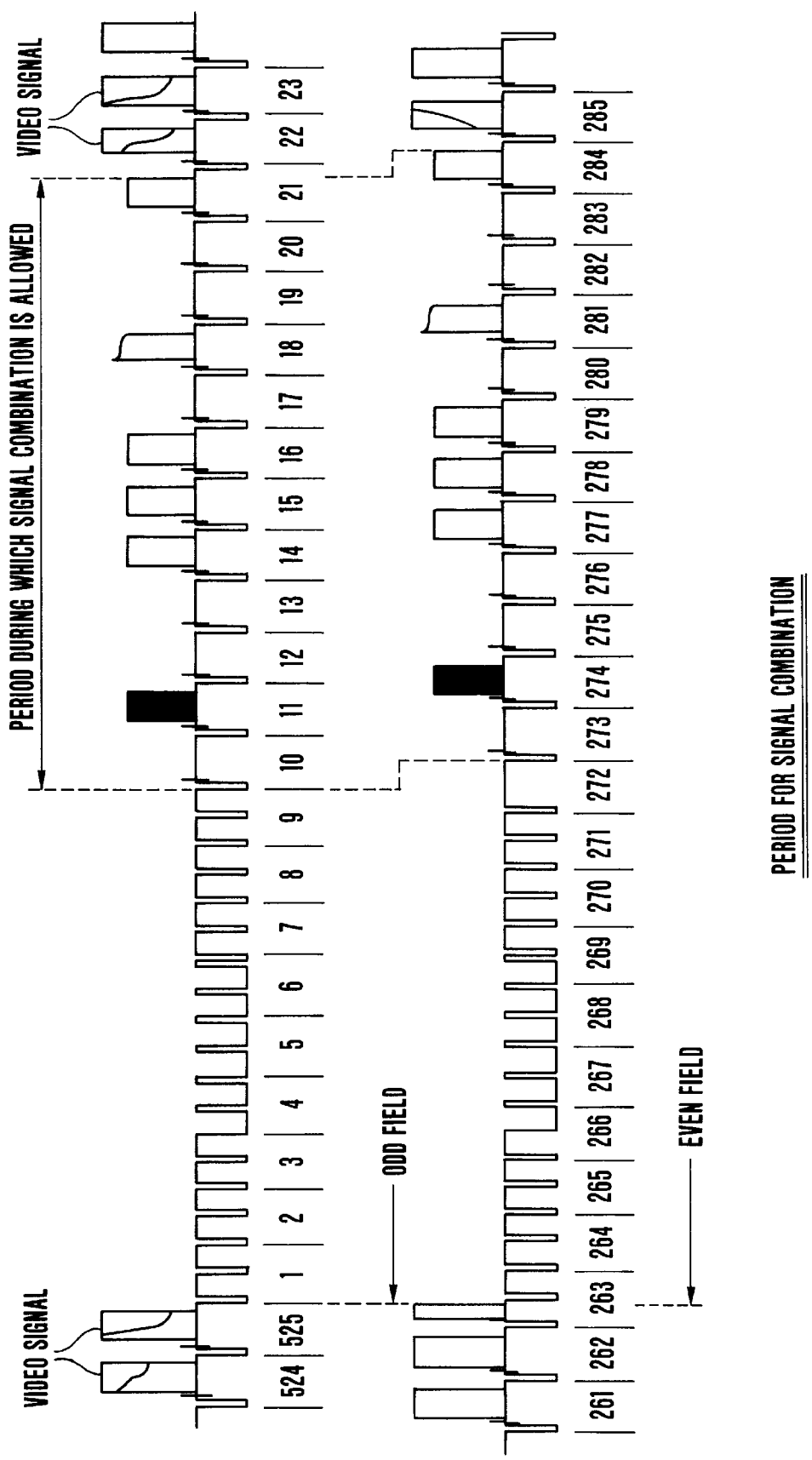
FIG. 3 is a chart illustrating signal combination for combining an image-information signal and a signal indicative of magnification information about an aspect ratio with each other.

An example of signal combination is shown in FIG. 3.

In the example shown in FIG. 3, aspect-ratio information on an image is recorded as digital data in the 11th H (H: horizontal scanning period) of an odd field and in the 274th H of an even field during the vertical blanking period of a video signal. Although in the embodiment the aspect-ratio information on an image is combined with each of the 11th H and the 274th H during the vertical blanking period, these H lines are not limitative examples. As a matter of course, the aspect-ratio information may be combined with any line of the 10th to 21st H's (in the odd field) and any line of the 273rd to 284th H's (in the even field) in the period during which signal combination is allowed, as shown in FIG. 3.

During such a vertical blanking period, the 14th, 15th, 16th, 21st, 277th, 278th, 279th and 284th H's are data-combining periods for teletext broadcasting, and GCR data for ghost elimination is combined with each of the 18th and 281st H's.

Figure 4:
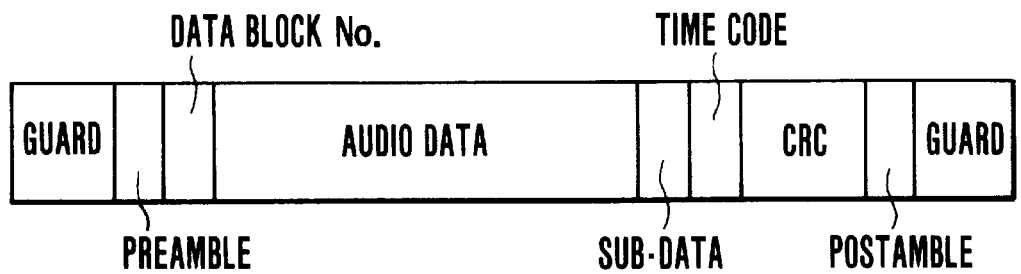
FIG. 4 is a view illustrating the data structure of a PCM audio track.

In the case of 8-mm video which is another recording system, each recording track is provided with a space for recording of a digital audio (PCM) signal in addition to a space for recording of a photographed video image (motion image). The data structure provided by PCM processing has a sub-data area in which subsidiary information can be stored, as shown in FIG. 4.

As an example, the aspect-ratio information on the image may be recorded in such a sub-data area.

The image information signal recorded on the magnetic tape 15 is read out by a magnetic reproducing head 16 and inputted into a signal converting circuit 17 in the magnetic reproducing apparatus.

If the recorded image information signal is by a color down-converting method, the signal from the magnetic reproducing head 16 is separated into a Y signal component and a C signal component. The Y and C signal components are respectively subjected to predetermined conversion and are outputted as a video signal of Y signal component and a video signal of C signal component.

These video signals are inputted to a signal converting circuit 18 of a signal processing device in a video projector. After the video signals have been subjected to predetermined signal processing, they are displayed as an image on a display element 19. If the display element 19 consists of a three-element liquid-crystal display panel or a three-element high-brightness Braun tube, primary-color signals of RGB are produced from the Y and C signals, and the primary-color signals are inputted to display elements provided for the respective primary colors.

The displayed image is passed through a projecting lens 20 and a projecting cylinder lens system 21, and is projected onto a screen 22.

The aspect-ratio information (magnification information) of the image which has been recorded on the magnetic tape 15 together with the image information is reproduced from the magnetic tape 15, and is separated from the image information by the magnetic-reproduction-side signal converting circuit 17 and transmitted to a lens driving circuit 24. The lens driving circuit 24 causes the projecting cylinder lens system 21 to move on the basis of the input magnification information.

The video projector itself is of a type which conforms to the existing television system, and the aspect ratio of the display element 19 is 4:3 which conforms to the aspect ratio of the image sensor 11 of the television camera which was used during recording.

In the first embodiment, the projecting cylinder lens system 21 has a configuration similar to that of the photographic cylinder lens system 9, and is constructed to produce power along its vertical cross section. The respective lenses which constitute the projecting cylinder lens system 21 are driven to change the spacings therebetween by lens-driving means (not shown) in response to a signal supplied from the lens driving circuit 24, thereby realizing the function of enlarging (or reducing) the angular field of view of an incident image to an arbitrary magnification in the vertical direction of that image.

In other words, it is possible to vary continuously the angular field of view of the image reproduced by the display element 19 in the vertical direction (along the frame height) by means of the projecting cylinder lens system 21 without varying such an angular field of view in the horizontal direction (along the frame width).

In the above-described arrangement, it is possible to vary continuously the aspect ratio of the image of the subject to be recorded even if the aspect ratio of the display element 19 itself is constant.

Accordingly, it is possible to display automatically an image of aspect ratio approximately equal to the aspect ratio of the photographed image by causing the individual lenses of the projecting cylinder lens system 21 to move by means of the lens driving circuit 24 by an amount corresponding to the magnification information recorded on the magnetic tape 15.

In addition, it is possible to project the image displayed on the display element 19 onto the screen 22 while fully utilizing the effective pixels of the display element 19. Accordingly, the deterioration of image quality can be minimized.

A cylinder lens system such as that used in the first embodiment, which can produce power while keeping its afocal state, may be realized by using a lens arrangement made up of three lens groups which include either the first positive lens group, the second negative lens group and the third positive lens group or the first negative lens group, the second positive lens group and the third negative lens group.

A specific example of design of such a cylinder lens system is described below.

Figure 5:
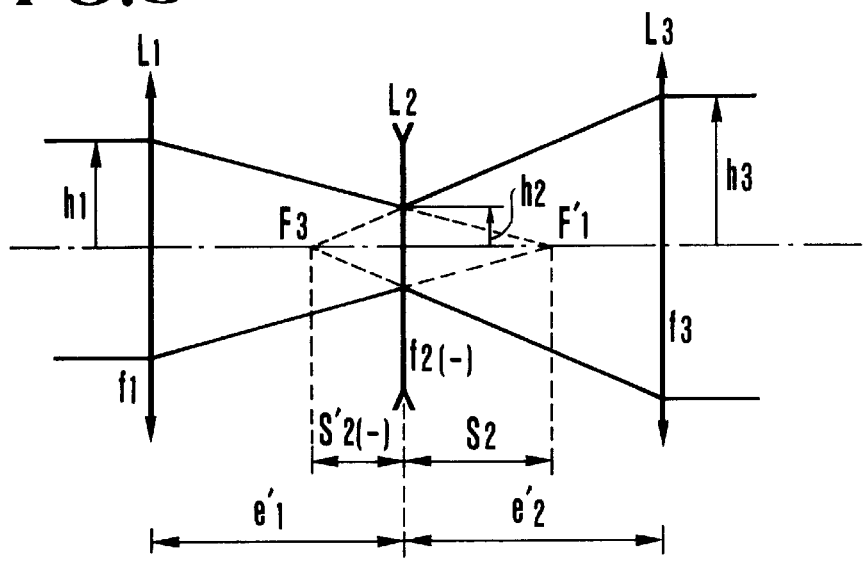
FIG. 5 is a view which serves to illustrate the operation of a cylinder lens system according to the first embodiment of the present invention.

The operation of this cylinder lens system is described with reference to the diagram of FIG. 5.

The lenses of the respective groups are shown as thin lenses $L_1$, $L_2$ and $L_3$, and the lenses $L_1$, $L_2$ and $L_3$ have focal points $f_1$, $f_2$ and $f_3$, respectively ($f_2$ has a minus value). The lens $L_1$ has a rear focal point $F_1'$, while the lens $L_3$ has a front focal point $F_3$. The distance between $L_2$ and $F_1'$ and the distance between $L_2$ and $F_3$ are represented by s2 and s2' (minus), respectively. Under these conditions, to realize a lens system which functions as an afocal system as a whole, it is necessary for lens spacings $e_1'$ and $e_2'$ to satisfy the following conditions:

$$e_1' = f_1 - s_2 \tag{1}$$

$$1/s_2' = 1/f_2 + 1/s_2 \tag{2}$$

$$e_2' = f_3 + s_2 \tag{3}$$

Heights $h_1$, $h_2$ and $h_3$ of light rays incident on the respective lenses $L_1$, $L_2$ and $L_3$ are as follows:

$$h_1/f_1 = h_2/s_2 \tag{4}$$

$$h_3/f_3 = h_2/s_2 \tag{5}$$

Thus, an angular magnification y across the cylinder lens system is represented as:

$$\gamma = h_1/h_3 \tag{6}$$

Therefore, if the above cylinder lens system is followed by a photographic lens system which is axially symmetrical to it, the angular field of view is varied at a magnification of y.

If Equations (1) to (6) are used, the following equations are obtained:

$$e_1' = f_1 + (1 + f_1/f_3/\gamma) \times f_2 \quad (7)$$

$$e_2' = f_3 + (1 + \gamma \times f_3/f_1) \times f_2 \quad (8)$$

Accordingly, even if $f_1$, $f_2$ and $f_3$ are each constant, the values of the respective lens spacings are determined which produce $\gamma$ having the required value while satisfying the afocal conditions (where $e_1'$ and $e_2'$ need to have positive values, respectively. In the case of the three-lens-group arrangement in which a negative lens group, a positive lens group and a negative lens group are arranged in that order, since $f_1$ has a negative value, $e_1'$ and $e_2'$ are each calculated as a negative value.)

Table 1 shows a radius of curvature $r_i$, a surface-to-surface spacing $d_i$, an index of refraction $n_i$ and an Abbe number $v_{di}$, where "$i$" represents the number of a surface of each lens when the surfaces are numbered in sequence from an entrance side (from the left).

TABLE 1

| | | $n_1 = 1.0$ | | |
|---|---|---|---|---|
| $L_1$ | $r_1 = 71.8194$ | | | |
| | $d_1' = 9.8$ | | $n_1' = 1.60311$ | $v_{d1}' = 60.7$ |
| | $r_2 = -87.7793$ | | | |
| | $d_2' = 0.0$ | | $n_2' = 1.0$ | |
| | $r_3 = -87.7793$ | | | |
| | $d_3' = 3.1$ | | $n_3' = 1.7552$ | $v_{d3}' = 27.5$ |
| | $r_4 = -447.896$ | | | |
| | | $n_4' = 1.0$ | | |
| $L_2$ | $r_5 = -57.9667$ | | | |
| | $d_5' = 5.2$ | | $n_5' = 1.80518$ | $v_{d5}' = 25.4$ |
| | $r_6 = -25.763$ | | | |
| | $d_6' = 0.0$ | | $n_6' = 1.0$ | |
| | $r_7 = -25.763$ | | | |
| | $d_7' = 2.0$ | | $n_7' = 1.51633$ | $v_{d7}' = 64.1$ |
| | $r_8 = 21.71638$ | | | |
| | | $n_8' = 1.0$ | | |
| $L_3$ | $r_9 = -338.091$ | | | |
| | $d_9' = 2.5$ | | $n_9' = 1.62004$ | $v_{d9}' = 36.3$ |
| | $r_{10} = 37.56563$ | | | |
| | $d_{10}' = 0.0$ | | $n_{10}' = 1.0$ | |
| | $r_{11} = 37.56563$ | | | |
| | $d_{11}' = 7.6$ | | $n_{11}' = 1.58313$ | $v_{d11}' = 59.4$ |
| | $r_{12} = -40.2518$ | | | |
| | | $n_{12}' = 1.0$ | | |

Table 2 shows a lens spacing Dk', a distance $e_k'$ between the principal points of each group and a focal length $f_k$ of each group in a lens system which provides the angular magnification $\gamma$, where "$k$" represents the number of the group of each lens.

TABLE 2

| | $f_1 = 120.0$ | $f_2 = -37.0$ | $f_3 = 84.0$ | |
|---|---|---|---|---|
| $\gamma$ | $D_1'$ | $e_1'$ | $D_2'$ | $e_2'$ |
| 0.75 | 2.47 | 12.52 | 18.39 | 27.58 |
| 0.80 | 6.88 | 16.93 | 17.09 | 26.28 |
| 0.85 | 10.77 | 20.82 | 15.80 | 24.99 |
| 0.90 | 14.22 | 24.27 | 14.50 | 23.69 |
| 0.95 | 17.31 | 27.36 | 13.21 | 22.40 |
| 1.00 | 20.09 | 30.14 | 11.91 | 21.10 |

Figure 6:
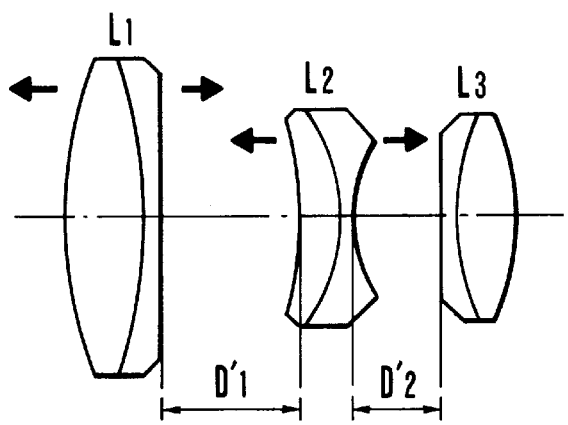
FIG. 6 is a schematic, vertical sectional view of the cylinder lens system according to the first embodiment of the present invention.

The shape of the vertical section of this lens system is shown in FIG. 6. In FIG. 6, the lenses of the respective groups are shown as the thin lenses $L_1$, $L_2$ and $L_3$, and each of the lenses $L_1$, $L_2$ and $L_3$ is made up of two lens elements which are united with each other. The symbols $D_1'$ and $D_2'$ shown in FIG. 6 denote the distances between the respective lenses.

Each of the thin lenses $L_1$ and $L_2$ is movable in opposite directions as indicated by the arrows shown in FIG. 6.

In the first embodiment, the first and second groups of the lens system can move to change the angular modification $\gamma$ between 0.75 times and 1 time. Accordingly, since the aspect ratio of the image at the image sensor 11 is 4:3, the aspect ratio of the image photographed and projected by the present system can be freely varied between 16:9 and 4:3 for display purpose.

Although each of the photographic lens 10 and the projecting lens 20 may be a single-focus lens, a zoom lens may be employed so that the angular field of view of an image to be photographed and/or projected can be varied far more freely.

A second embodiment of the present invention will be described below in detail with reference to FIGS. 7 and 8.

Figure 7:
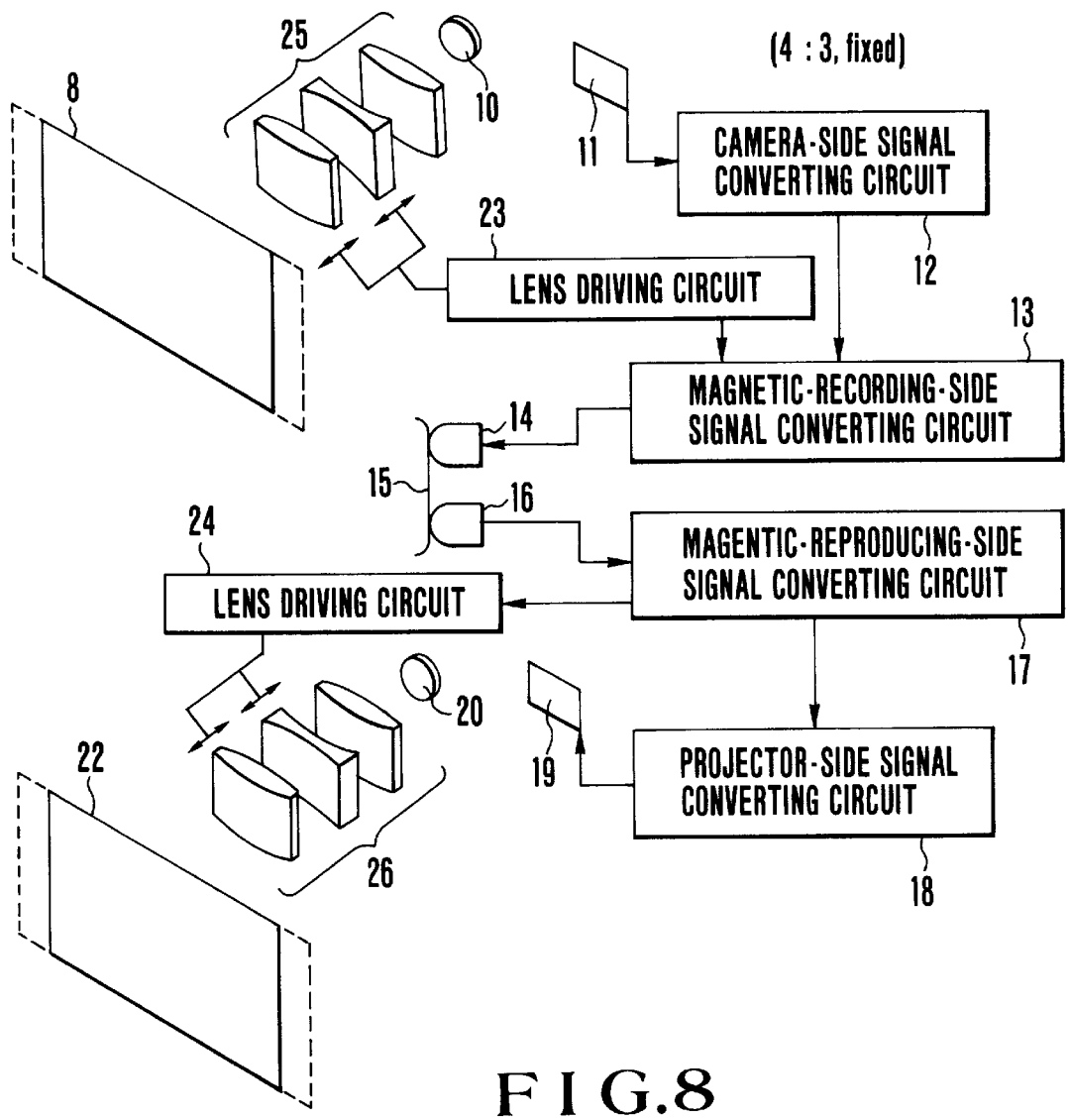
FIG. 7 is a schematic view which serves to illustrate a control operation for processing image information according to the second embodiment of the present invention.

In FIG. 7, the same reference numerals are used to denote constituent elements which are substantially identical to those shown in FIG. 2, and the description thereof is omitted.

In the second embodiment, each of a photographic cylinder lens system 25 and a projecting cylinder lens system 26 is constructed to produce power in the horizontal direction.

Accordingly, in the second embodiment, as the lens spacings in each of the cylinder lens systems 25 and 26 are varied, the angular field of view of an image is varied in the horizontal direction, while the angular field of view of the image in the vertical direction is not varied.

An example of design of such a cylinder lens system is shown in Tables 3 and 4.

TABLE 3

| | | $n_1 = 1.0$ | | |
|---|---|---|---|---|
| $L_1$ | $r_1 = 98.08418$ | | | |
| | $d_1' = 11.5$ | | $n_1' = 1.51633$ | $v_{d1}' = 64.1$ |
| | $r_2 = -71.0265$ | | | |
| | $d_2' = 0.0$ | | $n_2' = 1.0$ | |
| | $r_3 = -71.0265$ | | | |
| | $d_3' = 3.0$ | | $n_3' = 1.64769$ | $v_{d3}' = 33.8$ |
| | $r_4 = -258.048$ | | | |
| | | $n_4' = 1.0$ | | |
| $L_2$ | $r_5 = -100.477$ | | | |
| | $d_5' = 4.8$ | | $n_5' = 1.7552$ | $v_{d5}' = 27.5$ |
| | $r_6 = -37.6789$ | | | |
| | $d_6' = 0.0$ | | $n_6' = 1.0$ | |
| | $r_7 = -37.6789$ | | | |
| | $d_7' = 2.2$ | | $n_7' = 1.62041$ | $v_{d7}' = 60.3$ |
| | $r_8 = 56.38868$ | | | |
| | | $n_8' = 1.0$ | | |
| $L_3$ | $r_9 = 275.5261$ | | | |
| | $d_9' = 6.5$ | | $n_9' = 1.51633$ | $v_{d9}' = 64.1$ |
| | $r_{10} = -48.6223$ | | | |
| | $d_{10}' = 0.0$ | | $n_{10}' = 1.0$ | |
| | $r_{11} = -48.6223$ | | | |
| | $d_{11}' = 2.8$ | | $n_{11}' = 1.64769$ | $v_{d11}' = 33.8$ |
| | $r_{12} = -96.1938$ | | | |
| | | $n_{12}' = 1.0$ | | |

TABLE 4

| | $f_1 = 170.0$ | $f_2 = -66.0$ | $f_3 = -170.0$ | |
|---|---|---|---|---|
| $\gamma$ | $D_1'$ | $e_1'$ | $D_2'$ | $e_2'$ |
| 0.75 | 5.82 | 16.00 | 47.89 | 54.50 |
| 0.80 | 11.32 | 21.50 | 44.59 | 51.20 |
| 0.90 | 20.49 | 30.67 | 37.99 | 44.60 |

TABLE 4-continued

| | $f_1 = 170.0$ | $f_2 = -66.0$ | $f_3 = -170.0$ | |
|---|---|---|---|---|
| γ | $D_1'$ | $e_1'$ | $D_2'$ | $e_2'$ |
| 1.00 | 27.82 | 38.00 | 31.39 | 38.00 |
| 1.10 | 33.82 | 44.00 | 24.79 | 31.40 |
| 1.20 | 38.82 | 49.00 | 18.19 | 24.80 |
| 1.30 | 43.05 | 53.23 | 11.59 | 18.20 |
| 1.33 | 44.32 | 54.50 | 9.39 | 16.00 |

Figure 8:
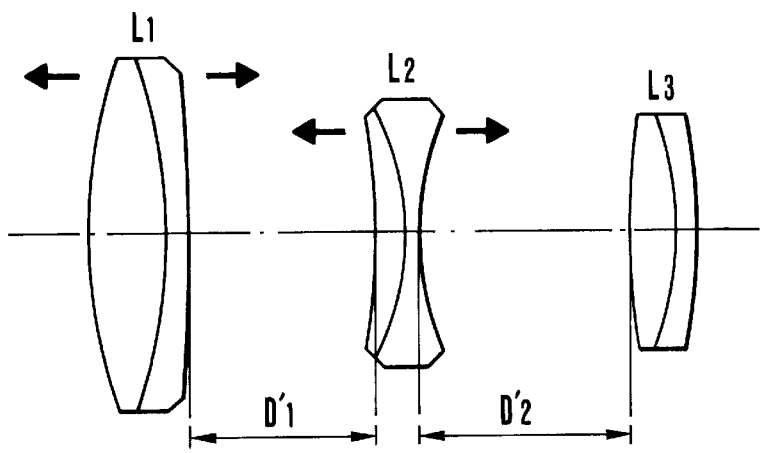
FIG. 8 is a schematic, horizontal sectional view of a cylinder lens system according to the second embodiment of the present invention.

The shape of the horizontal section of this lens system is shown in FIG. 8. In FIG. 8, the lenses of the respective groups are shown as the thin lenses $L_1$, $L_2$ and $L_3$, and each of the lenses $L_1$, $L_2$ and $L_3$ is made up of two lens elements which are united with each other. The symbols $D_1'$ and $D_2'$ shown in FIG. 8 denote the distances between the lenses of the respective groups. Each of the thin lenses $L_1$ and $L_2$ is movable in opposite directions as indicated by the arrows shown in FIG. 8.

In the second embodiment, the first and second groups of the lens system can move to change the angular modification γ between 0.75 times and 1.33 times.

Accordingly, since the aspect ratio of the image at the image sensor 11 is 4:3, the aspect ratio of the image photographed and projected by the present system can be freely varied between 16:9 and 1:1 for display purpose.

The control operation for processing image information in the embodiment of FIG. 7 is similar to that used in the first embodiment except for the way of converting the aspect ratio of an image.

A third embodiment of the present invention will be described below in detail with reference to FIGS. 9 and 10.

Figure 9:
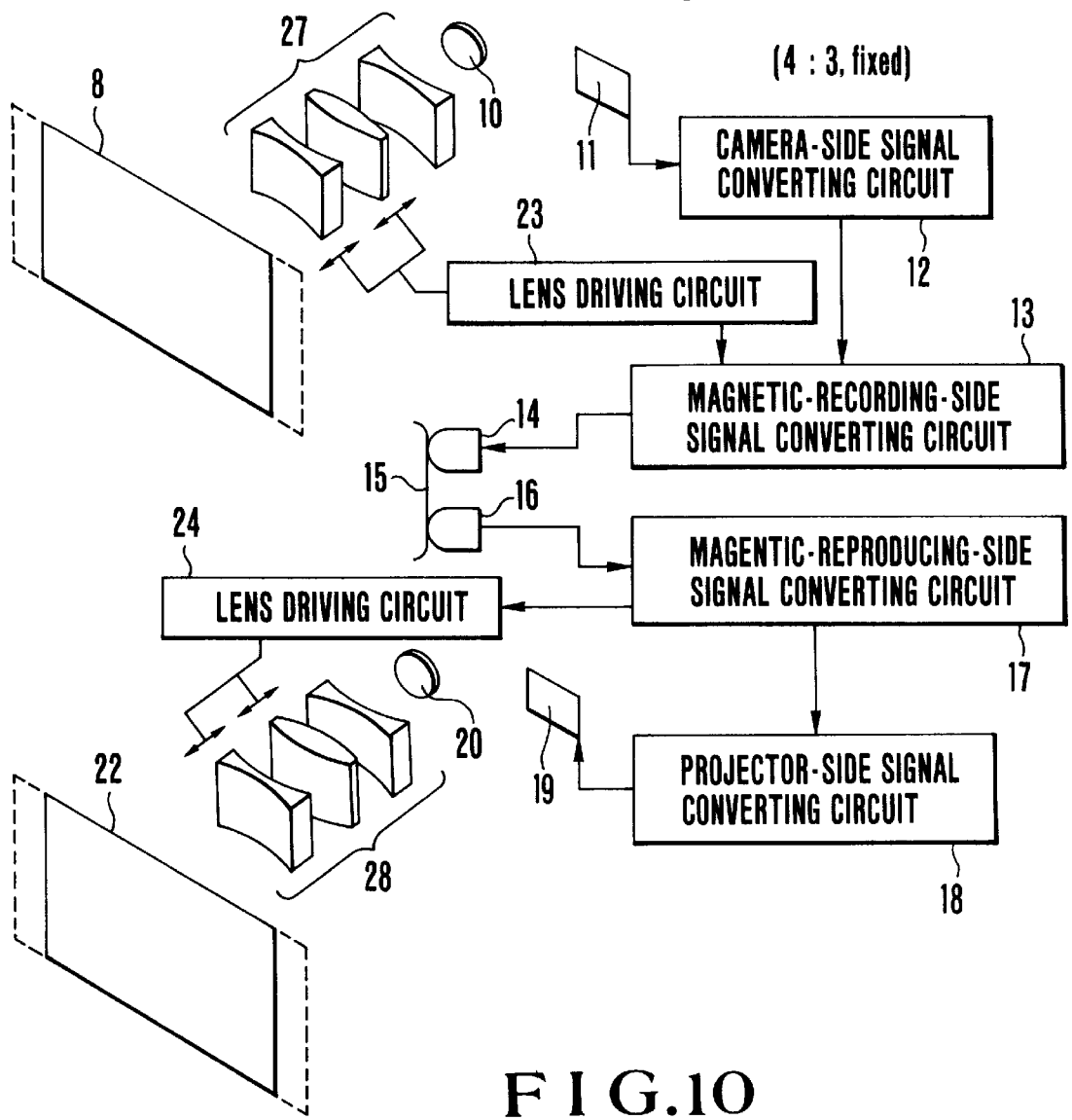
FIG. 9 is a schematic view which serves to illustrate a control operation for processing image information according to the third embodiment of the present invention.
Figure 10:
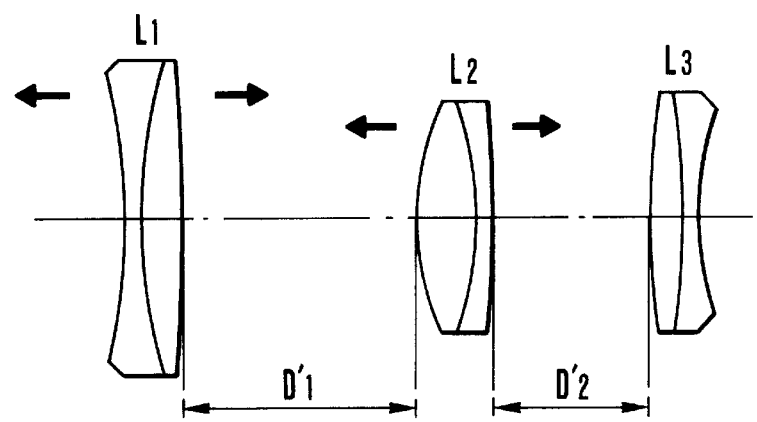
FIG. 10 is a schematic, horizontal sectional view of a cylinder lens system according to the third embodiment of the present invention.

In FIG. 9, the same reference numerals are used to denote constituent elements which are substantially identical to those shown in FIG. 2, and the description thereof is omitted.

In the third embodiment, each of a photographic cylinder lens system 27 and a projecting cylinder lens system 28 is constructed to produce power in the horizontal direction and so that the respective lens groups produce a negative power, a positive power and a negative power.

Accordingly, in the third embodiment, as the lens spacings in each of the cylinder lens systems 27 and 28 are varied, the angular field of view of an image is varied in the horizontal direction, while the angular field of view of the image in the vertical direction is not varied.

An example of design of such a cylinder lens system is shown in Tables 5 and 6.

TABLE 5

| | | $n_1 = 1.0$ | | |
|---|---|---|---|---|
| $L_1$ | $r_1 = -91.8566$ | | | |
| | $d_1' = 2.8$ | $n_1' = 1.51633$ | | $v_{d1}' = 64.1$ |
| | $r_2 = 84.79068$ | | | |
| | $d_2' = 0.0$ | $n_2' = 1.0$ | | |
| | $r_3 = 84.79068$ | | | |
| | $d_3' = 5.8$ | $n_3' = 1.64769$ | | $v_{d3}' = 33.8$ |
| | $r_4 = 442.4936$ | | | |
| | | $n_4' = 1.0$ | | |
| $L_2$ | $r_5 = 48.42063$ | | | |
| | $d_5' = 8.8$ | $n_5' = 1.60311$ | | $v_{d5}' = 60.7$ |
| | $r_6 = -42.939$ | | | |
| | $d_6' = 0.0$ | $n_6' = 1.0$ | | |
| | $r_7 = -42.939$ | | | |
| | $d_7' = 2.4$ | $n_7' = 1.7552$ | | $v_{d7}' = 27.5$ |

TABLE 5-continued

| | $r_8 = 135.308$ | | | |
|---|---|---|---|---|
| | | $n_8' = 1.0$ | | |
| $L_3$ | $r_9 = 172.9956$ | | | |
| | $d_9' = 4.6$ | $n_9' = 1.62004$ | | $v_{d9}' = 36.3$ |
| | $r_{10} = -115.33$ | | | |
| | $d_{10}' = 0.0$ | $n_{10}' = 1.0$ | | |
| | $r_{11} = -115.33$ | | | |
| | $d_{11}' = 2.2$ | $n_{11}' = 1.58313$ | | $v_{d11}' = 59.4$ |
| | $r_{12} = 60.70342$ | | | |
| | | $n_{12}' = 1.0$ | | |

TABLE 6

| | $f_1 = -180.0$ | $f_2 = 70.0$ | $f_3 = -180.0$ | |
|---|---|---|---|---|
| γ | $D_1'$ | $e_1'$ | $D_2'$ | $e_2'$ |
| 0.75 | 10.9 | 16.7 | 44.7 | 57.5 |
| 0.80 | 16.7 | 22.5 | 41.2 | 54.0 |
| 0.90 | 26.4 | 32.2 | 34.2 | 47.0 |
| 1.00 | 34.2 | 40.0 | 27.2 | 40.0 |
| 1.10 | 40.6 | 46.4 | 20.2 | 33.0 |
| 1.20 | 45.9 | 51.7 | 13.2 | 26.0 |
| 1.30 | 50.4 | 56.2 | 6.2 | 19.0 |
| 1.33 | 51.7 | 57.5 | 3.9 | 16.7 |

In Table 6, $e_1'$ and $e_2'$ are respectively shown as having positive values, but it will be understood that they take on minus values, according to Equations (7) and (8). The shape of the horizontal section of this lens system is shown in FIG. 10. In FIG. 10, the lenses of the respective groups are shown as the thin lenses $L_1$, $L_2$ and $L_3$, and each of the lenses $L_1$, $L_2$ and $L_3$ is made up of two lens elements which are united with each other. The symbols $D_1'$ and $D_2'$ shown in FIG. 10 denote the distances between the lenses of the respective groups. Each of the thin lenses $L_1$ and $L_2$ is movable in opposite directions as indicated by the arrows shown in FIG. 10.

In the third embodiment, the first and second groups of the lens system can move to change the angular modification γ between 0.75 times and 1.33 times.

Accordingly, since the aspect ratio of the image at the image sensor 11 is 4:3, the aspect ratio of the image photographed and projected by the present system can be freely varied between 16:9 and 1:1 for display purpose.

The control operation for processing image information in the embodiment of FIG. 9 is similar to that used in the first embodiment except for the way of converting the aspect ratio of an image.

A fourth embodiment of the present invention will be described below in detail with reference to FIG. 11.

Figure 11:
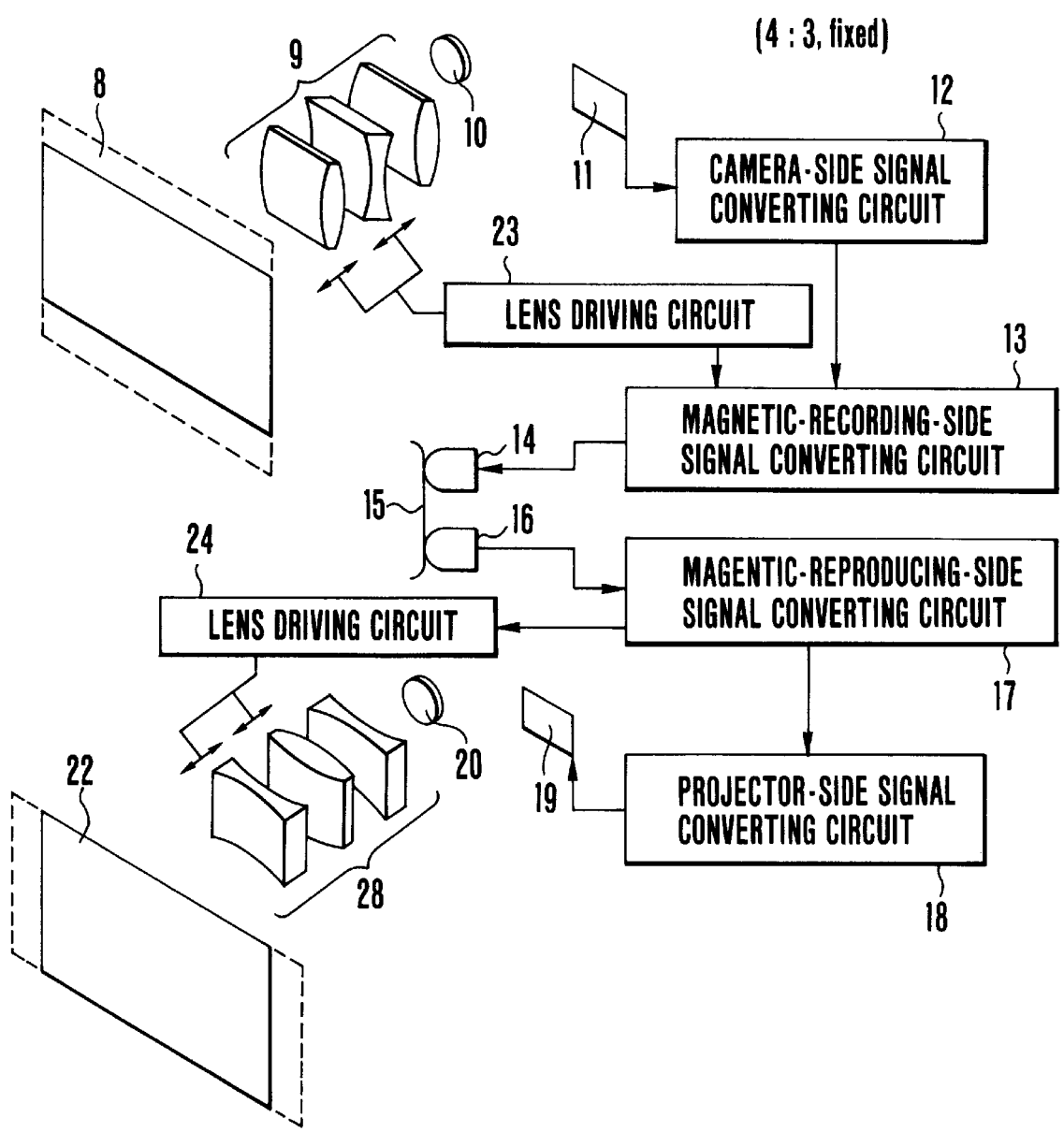
FIG. 11 is a schematic view which serves to illustrate a control operation for processing image information according to the fourth embodiment of the present invention.

In FIG. 11, the same reference numerals are used to denote constituent elements which are substantially identical to those shown in FIGS. 2 and 9, and the description thereof is omitted.

In the fourth embodiment, the photographic cylinder lens system 9 is constructed to produce power in the vertical direction and so that the respective lens groups produce a positive power, a negative power and a positive power. The projecting cylinder lens system 28 is constructed to produce power in the horizontal direction and so that the respective lens groups produce a negative power, a positive power and a negative power.

In the fourth embodiment, as the lens spacings in the photographic cylinder lens system 9 are varied, the angular field of view of an image is varied in the vertical direction, while the angular field of view of the image in the horizontal direction is not varied. As the lens spacings in the projecting cylinder lens system 28 are varied, the angular field of view of an image is varied in the horizontal direction, while the angular field of view of the image in the vertical direction is not varied.

The cylinder lens system shown in Table 1 as a design example may be used as the photographic cylinder lens system 9, while the cylinder lens system shown in Table 3 may be used as the projecting cylinder lens system 28.

In the fourth embodiment, the first and second groups of the photographic lens system 9 can move to change the angular modification y between 0.75 times and 1 time.

Accordingly, since the aspect ratio of the image at the image sensor 11 is 4:3, the aspect ratio of the image photographed and projected by the present system can be freely varied between 16:9 and 4:3 for recording purpose. Since the projecting cylinder lens system 2 can change its angular modification γ between 1 time and 1.33 times in accordance with the varied aspect ratio, it is possible to display an image of aspect ratio approximately equal to that of the photographed image.

As is apparent from the above description, the photographic cylinder lens system and the projecting cylinder lens system may not have the same characteristics, and it is possible to utilize any combination of lenses that can correct the aspect ratio of an image converted during photography and project the image at the corrected aspect ratio.

Accordingly, if a cylinder lens system of reduced weight is employed as the photographic cylinder lens system, an operator can easily handle the television camera during photography. For projection, a cylinder lens system of size which fully matches the size of a display screen can be used irrespective of weight or the like.

The control operation for processing image information in the embodiment of FIG. 11 is similar to that used in the first embodiment except for the way of converting the aspect ratio of an image.

A fifth embodiment of the present invention will be described below in detail with reference to FIG. 12.

Figure 12:
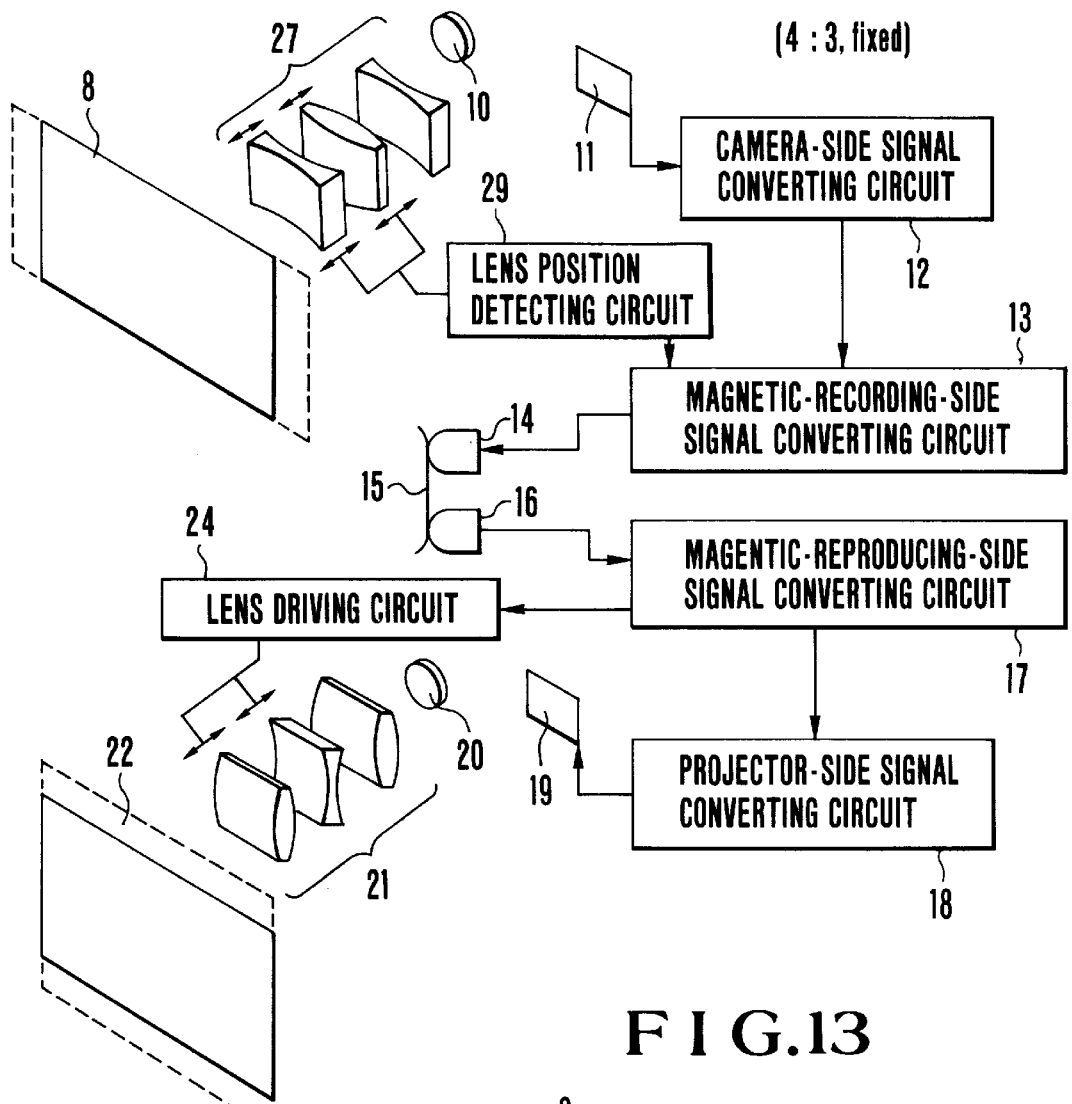
FIG. 12 is a schematic view which serves to illustrate a control operation for processing image information according to the fifth embodiment of the present invention.

In FIG. 12, the same reference numerals are used to denote constituent elements which are substantially identical to those shown in FIGS. 2 and 9, and the description thereof is omitted.

In the fifth embodiment, the photographic cylinder lens system 27 and the projecting cylinder lens system 21 have different characteristics, as in the case of the fourth embodiment. In the fifth embodiment, the photographic cylinder lens system 27 is constructed to produce power in the horizontal direction and so that the respective lens groups produce a negative power, a positive power and a negative power. The projecting cylinder lens system 21 is constructed to produce power in the vertical direction and so that the respective lens groups produce a positive power, a negative power and a positive power.

In the fifth embodiment, the lens spacings of the photographic cylinder lens system 27 are manually varied instead of being driven by the lens-driving means as in the case of the embodiment described above.

The variations of the lens spacings are detected by a lens-position detecting circuit 29, and the ratio of variation of the aspect ratio of a photographed image is transmitted to the magnetic-recording-side signal converting circuit 13 and is then recorded by the magnetic recording head 14.

In consequence, the varied aspect ratio of the photographed image is automatically converted in accordance with the aspect-ratio information recorded on the magnetic tape 15. Accordingly, even if an image is recorded while the aspect ratio is being varied continuously, no distorted image is displayed during projection.

The control operation for processing image information in the embodiment of FIG. 12 is similar to that used in the first embodiment except for the way of converting the aspect ratio of an image.

In each of sixth to tenth embodiments, instead of a cylinder lens system, a prism optical system made up of prisms is used to vary the aspect ratio of an image.

The sixth embodiment of the present invention will be described below in detail.

Figure 13:
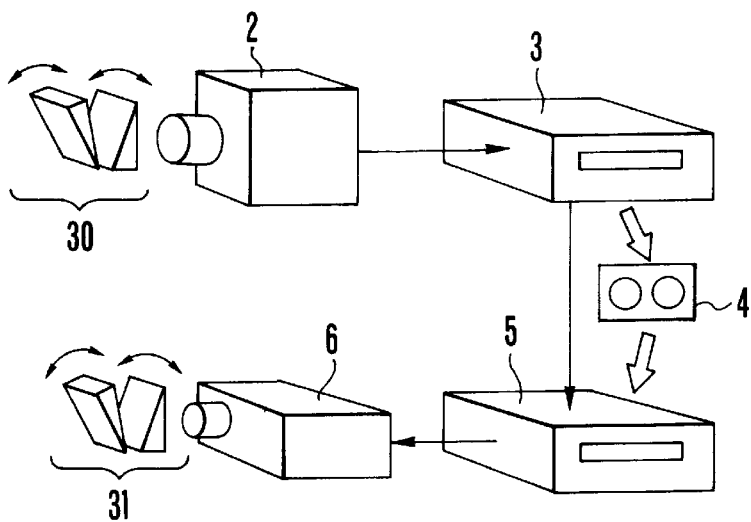
FIG. 13 is a schematic view showing the entire apparatus arrangement according to each of sixth to tenth embodiments of the present invention.

FIG. 13 is a schematic view showing the entire apparatus arrangement according to each of the sixth to tenth embodiments of the present invention.

In FIG. 13, the same reference numerals are used to denote constituent elements which are substantially identical to those shown in FIG. 1, and the description thereof is omitted.

A photographic prism optical system 30 is made up of prisms and has the function of optically converting the aspect ratio of an image. The angle of each prism with respect to the optical axis is varied by causing the prisms to rotate by prism-rotating means (not shown), so that the magnification of a photographed image can be varied along either one of the frame width and the frame height thereof.

A projecting prism optical system 31 is made up of prisms similarly to the photographic prism optical system 30, and has the function of optically converting the aspect ratio of an image so that the photographed image can be projected without distortion.

Control for processing image information will be described in detail with reference to FIG. 14.

Figure 14:
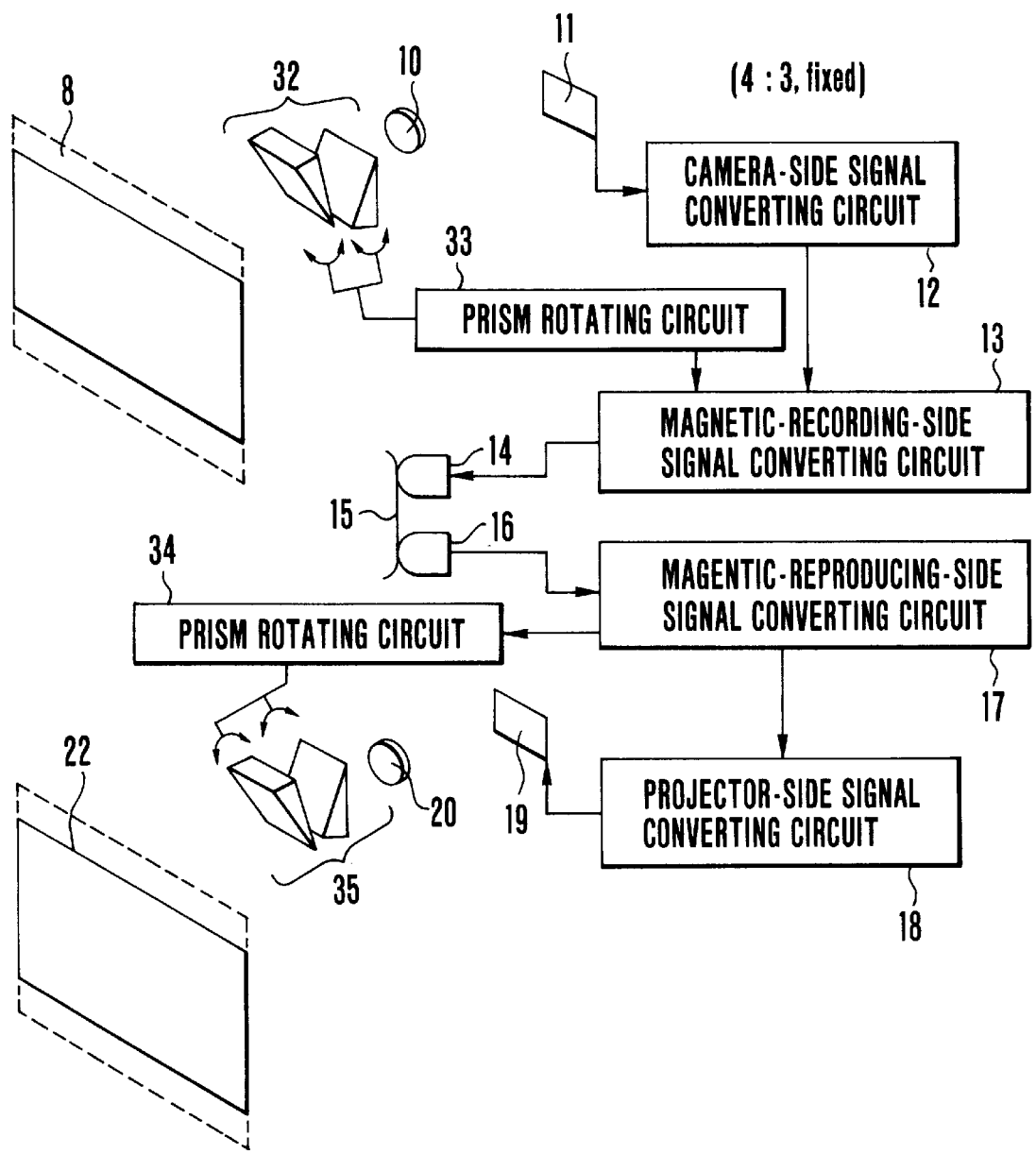
FIG. 14 is a schematic view which serves to illustrate a control operation for processing image information according to the sixth embodiment of the present invention.

In FIG. 14, the same reference numerals are used to denote constituent elements which are substantially identical to those shown in FIG. 2, and the description thereof is omitted.

A photographic prism optical system 32 is constructed to have a vertical angle in vertical section.

A motor for rotating each prism which constitutes the prim optical system 32 is driven in response to a signal supplied from a prism rotating circuit 33.

By this operation, the angle of each prism with respect to the optical axis is varied so that the angular field of view of an incident image in the vertical direction can be enlarged or reduced to an arbitrary magnification.

The projecting prism optical system 35 has a function similar to the photographic prism optical system 32, that is, a motor for rotating each prism which constitutes the prim optical system 35 is driven in response to a signal supplied from a prism rotating circuit 34.

By this operation, the angle of each prism with respect to the optical axis is varied so that the angular field of view of an incident image in the vertical direction can be enlarged or reduced to an arbitrary magnification.

The arrangement of the elements other than the above-described ones is similar to that of the arrangement of FIG. 2 (the first embodiment), and the control operation for processing image information is also similar to that used in first embodiment.

A prism optical system such as that used in the sixth embodiment may also be realized by using one prism group. However, since the optical axis on the entrance side and the optical axis on the exit side are bent at some angles due to the refractive power of the prism, the prism optical system consisting of one prism group is difficult to use in practice.

An additional problem is that as the prism optical system rotates, the angle at which the optical axis is bent is varied and the position of a subject (projected image) is offset. Accordingly, the prism optical system in the sixth embodiment is made up of two prism groups. The prism optical system is constructed to keep the optical axis on the entrance side in parallel with the optical axis on the exit side.

If the aspect ratio of an image is to be varied by means of such a prism optical system, the respective prisms rotate in different directions through an equal angle so that bending of the optical axis does not occur.

A specific example of design of such a prism optical system is shown in Tables 7 and 8.

TABLE 7

| FIRST GROUP | $\alpha_1$ | 11.0° |
|---|---|---|
| | $n_1$ | 1.51633 |
| | $vd_1$ | 64.1 |
| SECOND GROUP | $\alpha_2$ | 11.0° |
| | $n_2$ | 1.51633 |
| | $vd_2$ | 64.1 |

TABLE 8

| $\gamma$ | $i_1$ | $i_2$ |
|---|---|---|
| 0.75 | 42.78° | −35.08° |
| 0.80 | 37.83° | −30.72° |
| 0.90 | 25.03° | −18.90° |
| 1.00 | 8.36 | −2.65° |
| 1.10 | −6.58° | 12.64° |
| 1.20 | −16.30° | 23.04° |
| 1.30 | −22.50° | 29.96° |
| 1.33 | −24.08° | 31.78° |

The vertical section of the aforesaid prism optical system is shown in FIGS. 15(a), 15(b) and 15(c).

FIGS. 15(a), 15(b) and 15(c) show the states of each prism of the prism optical system for γ=1.33 times, γ=1.00 time, and γ=0.75 times, respectively.

In Table 7, n1 and $n_2$ represent the indices of refraction of the respective prism groups, $v_1$ and $v_2$ the Abbe numbers of the respective ones, and $\alpha_1$ and $\alpha_2$ the vertical angles of the respective ones. Table 8 shows variations in the angle of each prism group with respect to the optical axis for representative values of the angular modification γ. In Table 8, $i_1$ represents the angle of the first surface of the first prism group with respect to the vertical direction, while $i_2$ represents the angle of the first surface of the second prism group with respect to the vertical direction (refer to FIG. 15(a)).

The first prism group and the second prism group, which are designed as shown in Table 7, are rotated to vary the angular modification γ between 0.75 times and 1.33 times (refer to Table 8).

Accordingly, since the aspect ratio of the image at the image sensor 11 is 4:3, the aspect ratio of the image photographed and projected by the present system can be freely varied between 16:9 and 1:1 for display purpose by using the prism optical system having the above-described design.

A seventh embodiment of the present invention will be described below in detail with reference to FIG. 16 as well as FIGS. 17(a), 17(b) and 17(c).

Figure 16:
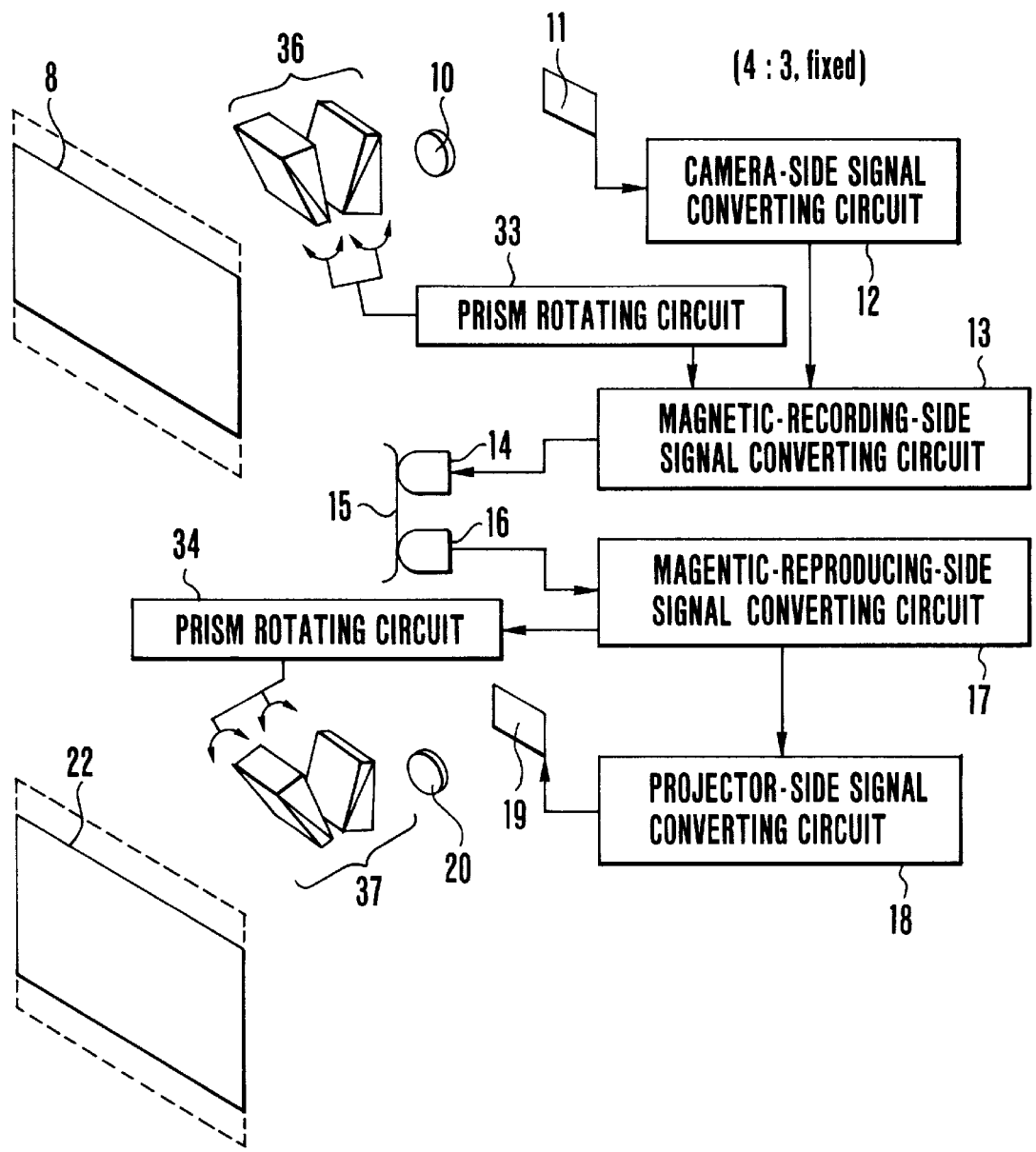
FIG. 16 is a schematic view which serves to illustrate a control operation for processing image information according to the seventh embodiment of the present invention.

In FIG. 16, the same reference numerals are used to denote constituent elements which are substantially identical to those shown in FIGS. 2 and 14, and the description thereof is omitted.

In the seventh embodiment of FIG. 16, each prism group of a photographic prism system 36 and a projecting prism system 37 is made up of a plurality of prisms which are cemented together to correct chromatic aberration (refer to FIG. 17(a)).

Accordingly, in the seventh embodiment, since the dispersion of light caused by refraction due to each prism is minimized, it is possible to provide an image of far higher quality.

In this embodiment, since the vertical angle of each cemented prism group is positioned in the vertical direction, as the angle of each prism group is varied, the angular field of view of an image varies in the vertical direction, while the angular field of view of the image in the horizontal direction is not varied.

A design example of such a prism optical system is shown in Tables 9 and 10.

TABLE 9

| FIRST GROUP | $\alpha_{11}$ | 6.54° |
|---|---|---|
| | $n_{11}$ | 1.80518 |
| | $vd_{11}$ | 25.4 |
| | $\alpha_{12}$ | 33.5° |
| | $n_{12}$ | 1.51633 |
| | $vd_{12}$ | 64.1 |
| SECOND GROUP | $\alpha_{21}$ | 6.54° |
| | $n_{21}$ | 1.80518 |
| | $vd_{21}$ | 25.4 |
| | $\alpha_{22}$ | 33.5° |
| | $n_{22}$ | 1.51633 |
| | $vd_{22}$ | 64.1 |

TABLE 10

| $\gamma$ | $i_1$ | $i_2$ |
|---|---|---|
| 0.75 | 37.15° | −23.58° |
| 0.80 | 33.35° | −20.23° |
| 0.90 | 25.44° | −12.94° |
| 1.00 | 17.71° | −5.41° |
| 1.10 | 10.94° | 1.52° |
| 1.20 | 5.47° | 7.38° |
| 1.30 | 1.20° | 12.16° |
| 1.33 | 0.00° | 13.53° |

The vertical section of the aforesaid prism optical system is shown in FIGS. 17(a), 17(b) and 17(c).

FIGS. 17(a), 17(b) and 17(c) show the states of each prism of the prism optical system for γ=1.33 times, γ=1.00 time, and γ=0.75 times, respectively.

In Table 9, $n_{11}$ and $n_{12}$ represent the indices of refraction of the first prism group, $v_{11}$ and $v_{12}$ the Abbe numbers of the first one, and $\alpha_{11}$ and $\alpha_{12}$ the vertical angles of the first one. $n_{21}$ and $n_{22}$ represent the indices of refraction of the second prism group, $v_{21}$ and $v_{22}$ the Abbe numbers of the second one, and $\alpha_{21}$ and α22 the vertical angles of the second one.

Table 10 shows variations in the angle of each prism group of the prism optical system with respect to the optical axis for representative values of the angular modification γ. In Table 10, $i_1$ represents the angle of the first surface of the first prism group with respect to the vertical direction, while $i_2$ represents the angle of the first surface of the second prism group with respect to the vertical direction (refer to FIG. 17(a)).

The first prism group and the second prism group, which are designed as shown in Table 9, are rotated to vary the angular modification γ between 0.75 times and 1.33 times (refer to Table 10).

Accordingly, since the aspect ratio of the image at the image sensor 11 is 4:3, the aspect ratio of the image photographed and projected by the present system can be freely varied between 16:9 and 1:1 for display purpose.

The control operation for processing image information in the embodiment of FIG. 16 is similar to that used in the first embodiment except for the way of converting the aspect ratio of an image.

An eighth embodiment of the present invention will be described below in detail with reference to FIG. 18 as well as FIGS. 19(*a*), 19(*b*) and 19(*c*).

Figure 18:
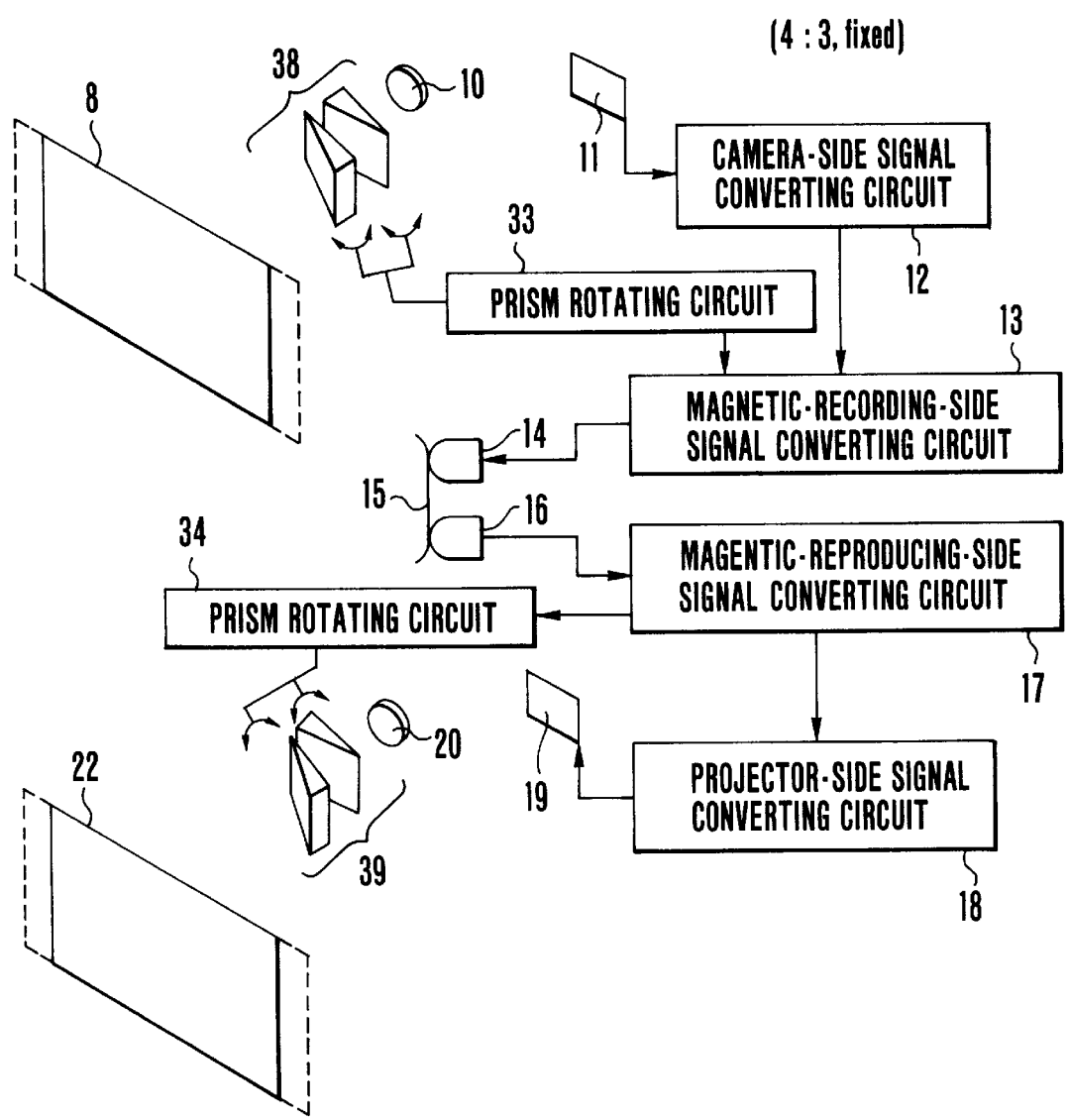
FIG. 18 is a schematic view which serves to illustrate a control operation for processing image information according to the eighth embodiment of the present invention.

In FIG. 18, the same reference numerals are used to denote constituent elements which are substantially identical to those shown in FIGS. 2 and 14, and the description thereof is omitted.

In the eighth embodiment, a photographic prism system 38 and a projecting prism system 39 are each constructed to produce power in the horizontal direction.

Accordingly, in the eighth embodiment, as the angle of each prism group with respect to the optical axis is varied, the angular field of view of an image varies in the horizontal direction, while the angular field of view of the image in the vertical direction is not varied.

A design example of such a prism optical system is shown in Tables 11 and 12.

TABLE 11

| FIRST GROUP | $\alpha_1$ | 21.7° |
|---|---|---|
| | $n_1$ | 1.60311 |
| | $vd_1$ | 60.7 |
| SECOND GROUP | $\alpha_2$ | 21.7° |
| | $n_2$ | 1.60311 |
| | $vd_2$ | 60.7 |

TABLE 12

| $\gamma$ | $i_1$ | $i_2$ |
|---|---|---|
| 0.75 | 36.45° | −21.78° |
| 0.80 | 32.73° | −18.51° |
| 0.90 | 25.05° | −11.43° |
| 1.00 | 17.56° | −4.13° |
| 1.10 | 10.94° | 2.65° |
| 1.20 | 5.49° | 8.49° |
| 1.30 | 1.15° | 13.33° |
| 1.33 | 0.00° | 14.65° |

The horizontal section of the aforesaid prism optical system is shown in FIGS. 19(*a*), 19(*b*) and 19(*c*).

FIGS. 19(*a*), 19(*b*) and 19(*c*) show the states of each prism of the prism optical system for γ=1.33 times, γ=1.00 time, and γ=0.75 times, respectively.

In Table 11, $n_1$ and $n_2$ represent the indices of refraction of the respective prism groups, $v_1$ and $v_2$ the Abbe numbers of the respective ones, and $\alpha_1$ and $\alpha_2$ the vertical angles of the respective ones.

Table 12 shows variations in the angle of each prism group of the prism optical system with respect to the optical axis for representative values of the angular modification γ. In Table 12, $i_1$ represents the angle of the first surface of the first prism group with respect to the vertical direction, while $i_2$ represents the angle of the first surface of the second prism group with respect to the vertical direction (refer to FIG. 19(*a*)).

The first prism group and the second prism group, which are designed as shown in Table 11, are rotated to vary the angular modification γ between 0.75 times and 1.33 times (refer to Table 12).

Accordingly, since the aspect ratio of the image at the image sensor 11 is 4:3, the aspect ratio of the image photographed and projected by the present system can be freely varied between 16:9 and 1:1 for display purpose.

The control operation for processing image information in the embodiment of FIG. 18 is similar to that used in the first embodiment except for the way of converting the aspect ratio of an image.

A ninth embodiment of the present invention will be described below in detail with reference to FIG. 20.

Figure 20:
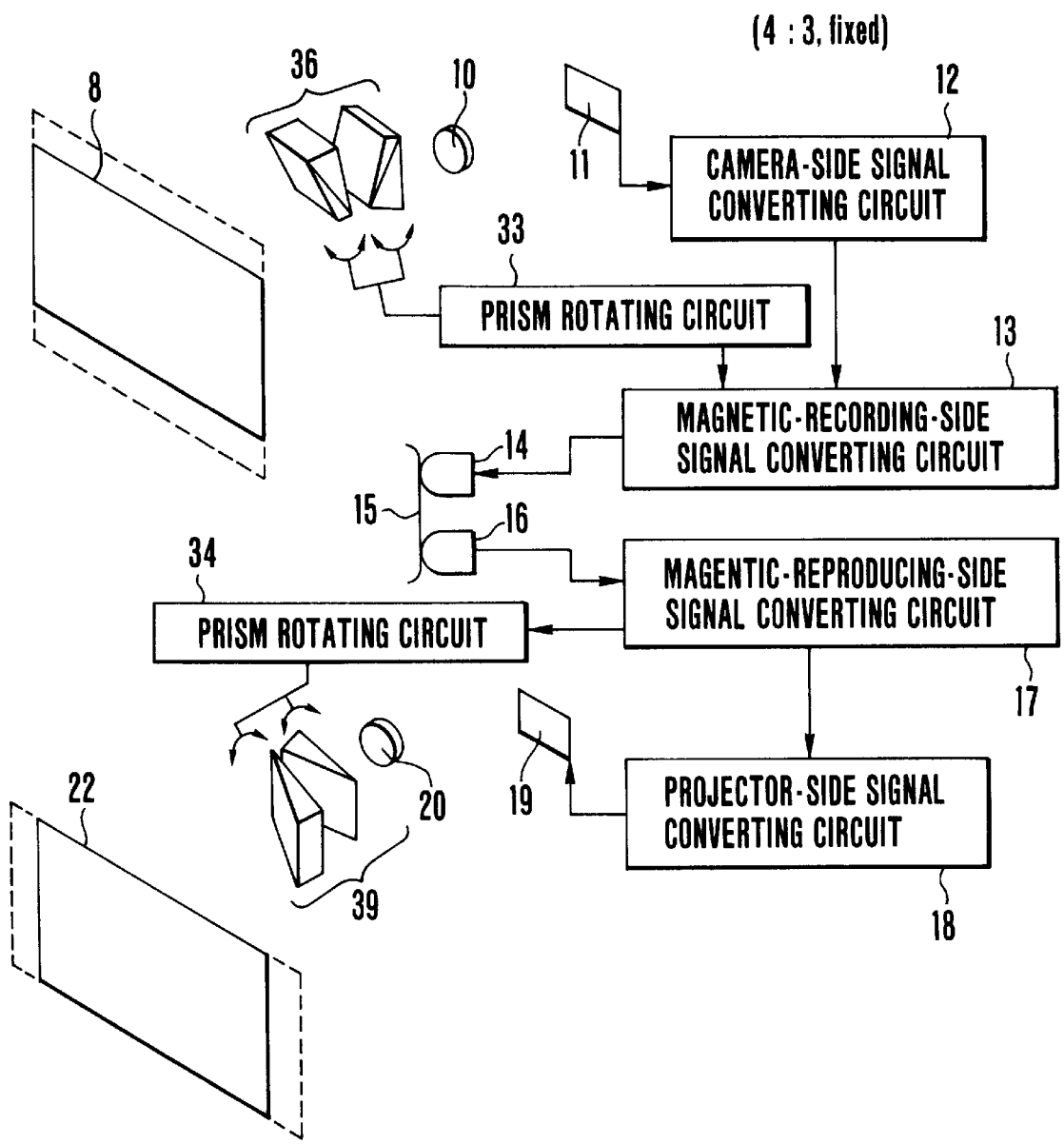
FIG. 20 is a schematic view which serves to illustrate a control operation for processing image information according to the ninth embodiment of the present invention.

In FIG. 20, the same reference numerals are used to denote constituent elements which are substantially identical to those shown in FIGS. 2, 16 and 18, and the description thereof is omitted.

The ninth embodiment is arranged by using the photographic prism system 36 used in the seventh embodiment and the projecting prism system 39 used in the eighth embodiment.

In the ninth embodiment, as the angle of the photographic prism system 36 with respect to the optical axis is varied, the angular field of view of an image varies in the vertical direction, while the angular field of view of the image in the horizontal direction is not varied. As the angle of the projecting prism system 39 with respect to the optical axis is varied, the angular field of view of the image varies in the horizontal direction, while the angular field of view of the image in the vertical direction is not varied.

In the ninth embodiment, the first prism group and the second prism group in the photographic prism system 36 are rotated to vary the angular magnification γ between 0.75 times and 1.33 times.

Accordingly, since the aspect ratio of the image at the image sensor 11 is 4:3, the image photographed by the present system can be recorded at an arbitrary aspect ratio which is between 16:9 and 4:3. Since the projecting prism system 39 varies the angular magnification y between 1.33 times and 0.75 times in accordance with the aforesaid arbitrary aspect ratio, it is possible to display an image of aspect ratio equal to that of the photographed image.

As is apparent from the above description, the photographic prism system and the projecting prism system may not have the same characteristics, and it is possible to utilize any combination of prisms that can correct the aspect ratio of an image converted during photography and project the image at the corrected aspect ratio.

Accordingly, if a prism system of reduced weight is employed as the photographic prism system, an operator can easily handle the television camera during photography. For projection, a prism system of size which fully matches the size of a display screen can be used irrespective of weight or the like.

The control operation for processing image information in the embodiment of FIG. 20 is similar to that used in the first embodiment except for the way of converting the aspect ratio of an image.

A tenth embodiment of the present invention will be described below in detail with reference to FIG. 21.

Figure 21:
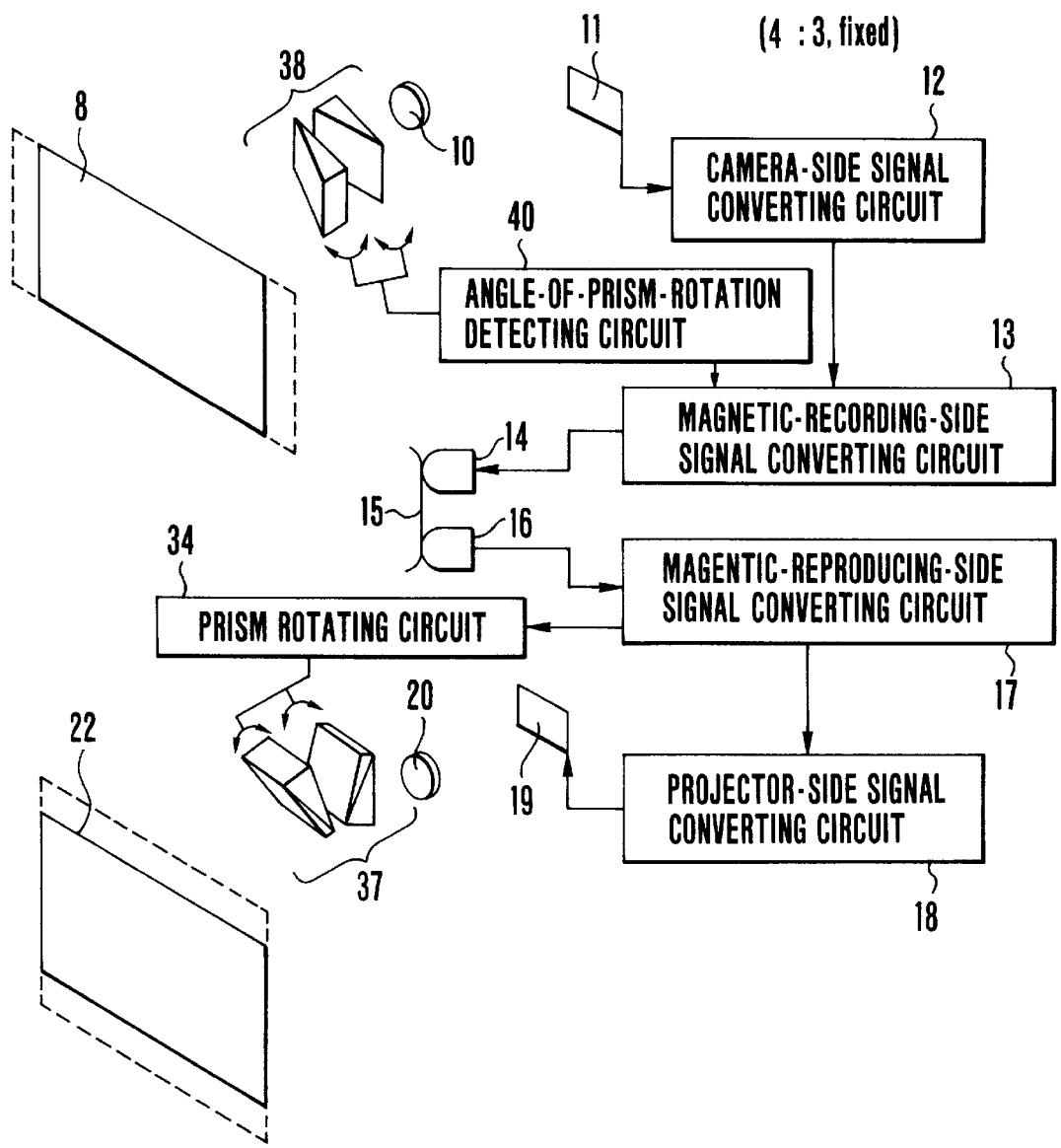
FIG. 21 is a schematic view which serves to illustrate a control operation for processing image information according to the tenth embodiment of the present invention.

In FIG. 21, the same reference numerals are used to denote constituent elements which are substantially identical to those shown in FIGS. 2, 16 and 18, and the description thereof is omitted.

The tenth embodiment is arranged by using the photographic prism system 38 used in the eighth embodiment and the projecting prism system 37 used in the seventh embodiment.

In the tenth embodiment, the photographic prism system and the projecting prism system have different constructions, as in the ninth embodiment, and the photographic prism system 38 of the tenth embodiment is constructed to produce power in the horizontal direction, while the projecting prism system 37 is constructed to produce power in the vertical direction.

In the tenth embodiment, the angle of the photographic prism system with respect to the optical axis is varied not by prism-rotating means but by a manual operation.

The variation of the angle is detected by an angle-of-prism-rotation detecting circuit 40, and the ratio of variation of the aspect ratio of a photographed image is transmitted to the magnetic-recording-side signal converting circuit 13 and is then recorded by the magnetic recording head 14.

Accordingly, since there is no need to have means (e.g., a motor) for rotating each prism for conversion of the aspect ratio during photography, it is possible to provide a photographic apparatus which has a simplified construction and a reduced weight.

During projection, the varied aspect ratio of a photographed image is automatically converted in accordance with the aspect-ratio information recorded on the magnetic tape 15. Accordingly, even if an image is recorded while the aspect ratio is being varied continuously, no distorted image is displayed during projection.

The control operation for processing image information in the embodiment of FIG. 21 is similar to that used in the first embodiment except for the way of converting the aspect ratio of an image.

An eleventh embodiment of the present invention is described below in detail with reference to FIG. 22 through FIGS. 25(a) to 25(e).

Figure 22:
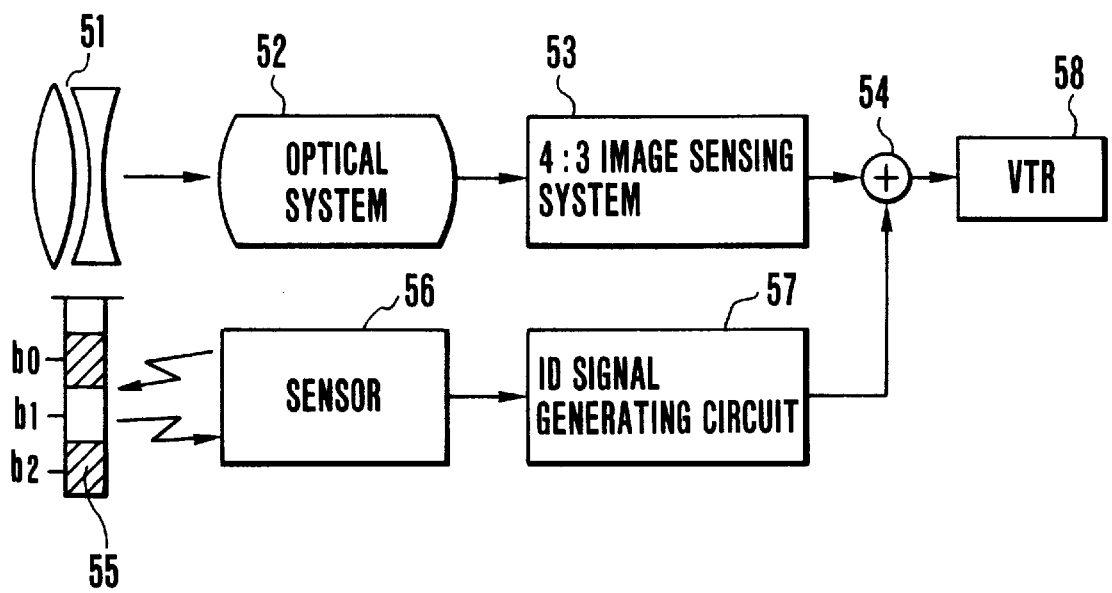
FIG. 22 is a schematic block diagram showing a compression-ratio discrimination signal generating apparatus according to an eleventh embodiment of the present invention.
Figure 23:
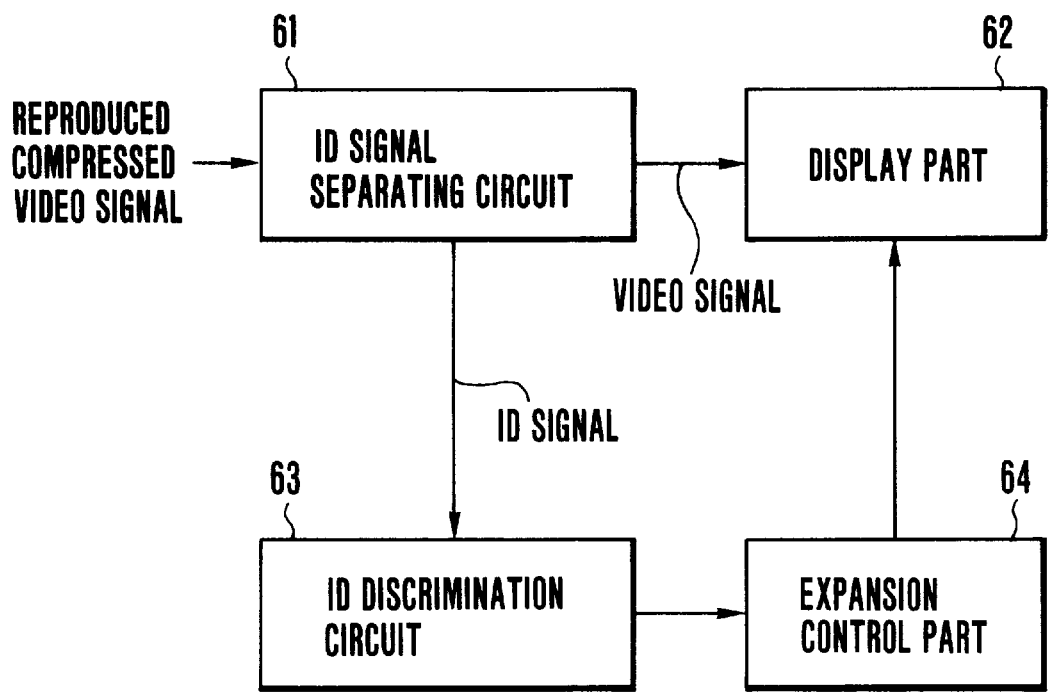
FIG. 23 is a schematic block diagram showing a reproduction system according to the eleventh embodiment of the present invention.
Figure 24A:
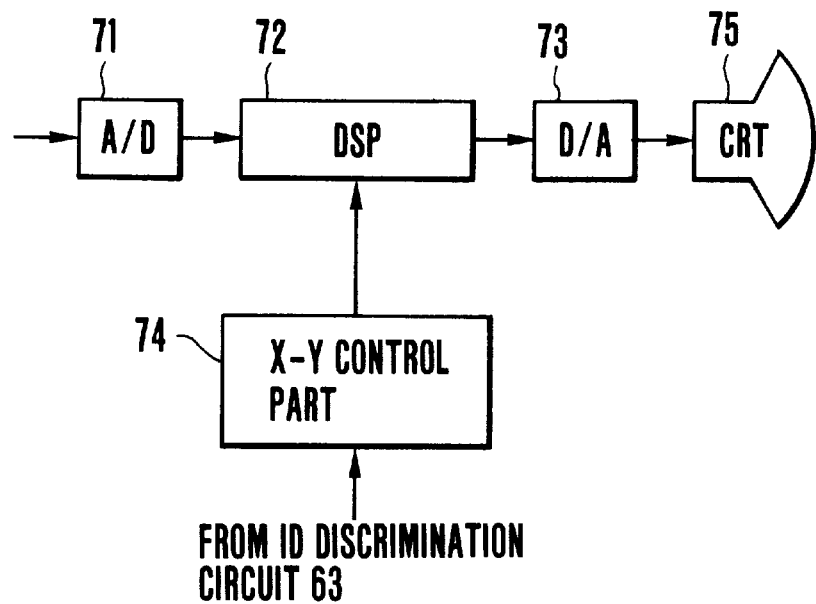
FIGS. 24(a) and 24(b) are schematic block diagrams showing a compressed-image expanding apparatus according to the eleventh embodiment of the present invention.
Figure 24B:
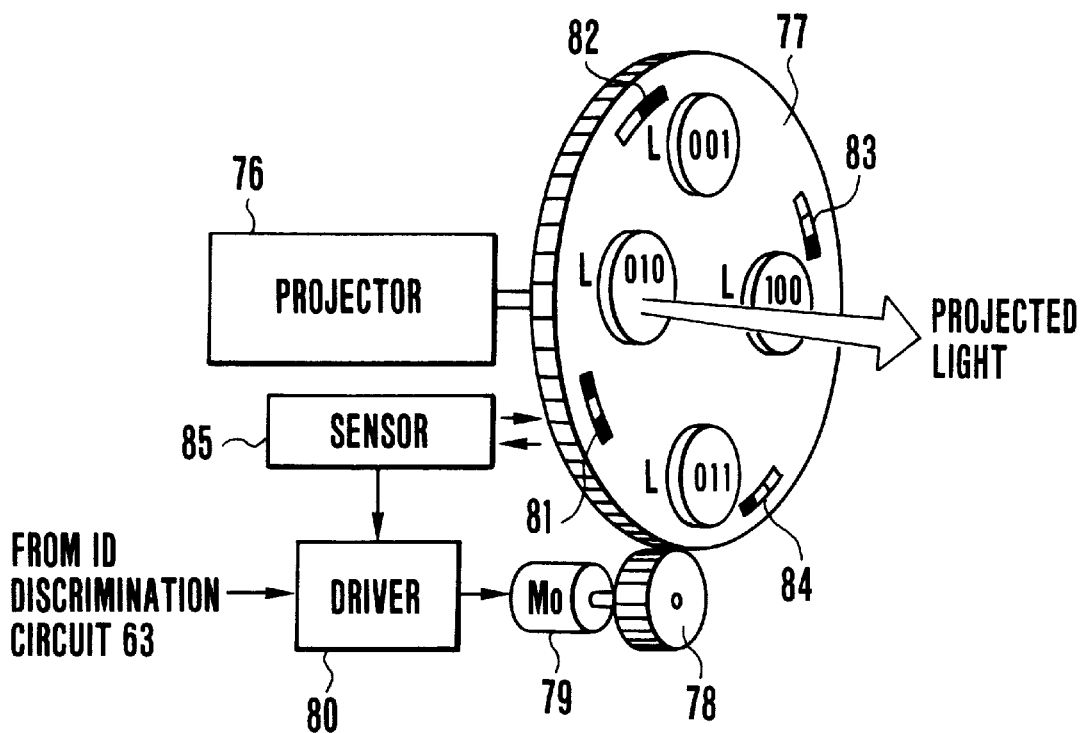
Figure 25A:
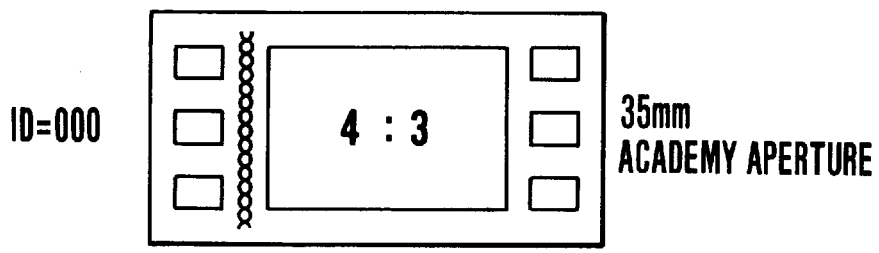
FIGS. 25(a) to 25(e) are views showing the aspect ratios of different movie systems.
Figure 25B:
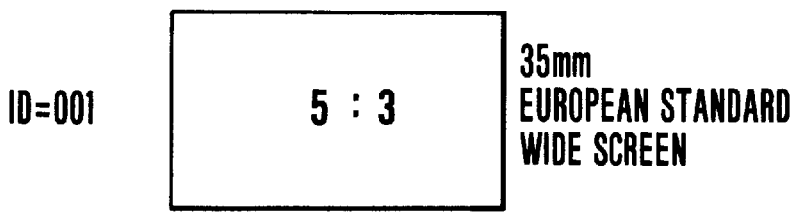
Figure 25C:
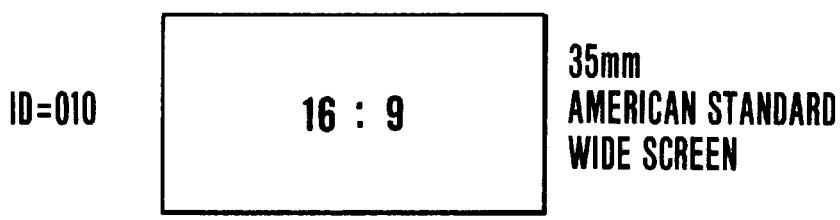
Figure 25D:
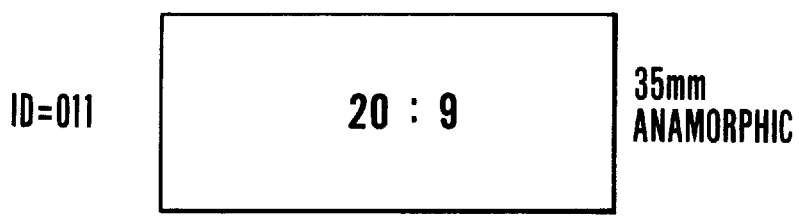
Figure 25E:
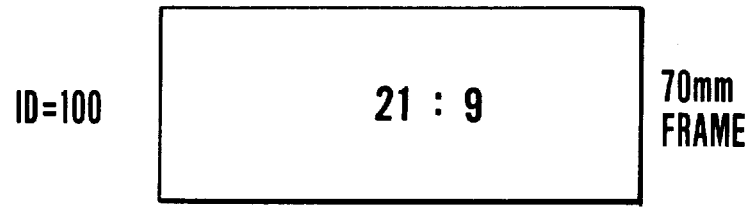

FIG. 22 is a block diagram schematically showing a compression-ratio discrimination signal generating apparatus according to the eleventh embodiment, FIG. 23 is a block diagram schematically showing a reproducing system according to the eleventh embodiment, FIGS. 24(a) and 24(b) are schematic diagrams illustrating the expansion of an image signal according to the eleventh embodiment, and FIGS. 25(a) to 25(e) are views showing the aspect ratios of different movie systems.

The arrangement shown in FIG. 22 includes a linear compression optical system (anamorphic lens) 51, an ordinary imaging optical system 52, an ordinary image sensing system (video camera) 53, an adder 54, a code table 55 for discrimination between the compression ratios of the anamorphic lens 51, a sensor 56 for reading the code table 55, an ID signal generating circuit 57 for generating a detection result by the sensor 56 as a compression-ratio discrimination signal (ID signal), and a VTR 58 for recording a video signal outputted from the adder 54.

The operation of reading the code table 55 for discrimination between compression ratios is as follows. The code table 55 shown in FIG. 22 is composed of three bits, b0, b1 and b2, and the discrimination therebetween is performed by an optical reflection method. The sensor 56 provides an output of 1 in the presence of reflected light or 0 in the absence thereof. Accordingly, the code table 55 of FIG. 22 is read in the order of 0, 1 and 0.

FIGS. 25(a) to 25(e) show the aspect ratios of different movie systems. In the examples shown in FIGS. 25(a) to 25(e), an ID signal 000 indicates an aspect ratio of 4:3, an ID signal 001 indicates an aspect ratio of 5:3, an ID signal 010 indicates an aspect ratio of 16:9, an ID signal 011 indicates an aspect ratio of 20:9, and an ID signal 100 indicates an aspect ratio of 21:9. With such ID signals, it can be determined that the lens used in the arrangement of FIG. 22 is an anamorphic lens which varies the aspect ratio of an image from 16:9 to 4:3, that is, which compresses an image which is being actually photographed to ¾ in the horizontal direction.

If the lens 51 is not attached, no light reflection occurs and the result is "all zero" and it is determined, therefore, that no image is compressed.

The ID signal generating circuit 57 receives such a detection result and converts it into a signal form which can be combined with a video signal. The adder 54 combines the compressed video signal with the ID signal, and the thus combined signal is recorded by the VTR 58.

As described in connection with the first embodiment, such signal combination is carried out in such a manner that the ID signal is inserted as digital data in the 11th H of an odd field and in the 274th H of an even field during the vertical blanking period of the video signal.

A recording system will be described below with reference to FIG. 23.

The arrangement shown in FIG. 23 includes an ID signal separating circuit 61, a video display part 62, an ID discrimination circuit 63 and an expansion control part 64.

A reproducing operation will be described below.

As described above, the ID signal indicative of compression-ratio information is combined with part of the vertical blanking portion of the video signal. The ID signal separating circuit 61 separates the combined signal into the video signal and the ID signal, and in the ID discrimination circuit 63, a compression ratio is detected and an expansion ratio is obtained from the compression ratio. The expansion control part 64 switches the ratio of expansion to vary the expansion ratio of the image at the video display part 62 in the horizontal direction.

Expansion control according to the eleventh embodiment for reproducing an original image from an optically compressed, recorded image will be described below with reference to FIGS. 24(a) and 24(b).

The apparatus shown in FIG. 24(a) is arranged to expand electrically a compressed image, and includes an A/D converter 71, a digital signal processing circuit (DSP) 72, a D/A converter 73, an X-Y control part 74 for controlling the X-Y ratio of an image, and a CRT monitor 75.

The expansion control operation of the apparatus having the above-described arrangement will be described below.

A compressed video signal is digitized by the A/D converter 71 and inputted to the digital signal processing circuit (DSP) 72. The digital signal processing circuit (DSP) 72 expands the input signal relatively horizontally by appropriately setting an X-Y ratio for processing the reduced image on the basis of a compression-ratio information provided by the ID signal discrimination circuit 63. After such processing, the D/A converter 73 converts the expanded digital signal into an analog wide-screen video signal, and the CRT monitor 75 displays it as a visual image.

As another control example, the scan of the CRT monitor 75 may be directly controlled to expand electrically a compressed image.

The apparatus shown in FIG. 24(b) is arranged to expand optically a compressed image, and includes a projector 76, a rotating disc 77 provided with anamorphic lenses each having a different expansion ratio, a gear 78, a motor 79 for rotating the rotating disc 77 through the gear 78, a driver 80 for controlling the motor 79, code tables 81 to 84 indicative of the aspect ratios of images displayed during reproduction by the respective lenses, and a sensor 85 for reading each of the code tables 81 to 84.

The expansion control operation of the apparatus having the above-described arrangement is described below.

An output signal of the ID discrimination circuit 63 is inputted into the driver 80, and the driver 80 drives the motor 79 to rotate the rotating disc 77. During the rotation of the rotating disc 77, the sensor 85 reads the code tables 81 to 84 of the respective lenses and provides its output to an input of the driver 80. If the output coincides with the ID signal provided by the ID discrimination circuit 63 of FIG. 23, the driver 80 stops driving the motor 79 to enable reproduction of the recorded image.

A twelfth embodiment of the present invention will be described below in detail with reference to FIG. 26.

In the twelfth embodiment, the present invention is applied to conversion from optical images formed on silver-salt movie film to television signals.

Figure 26:
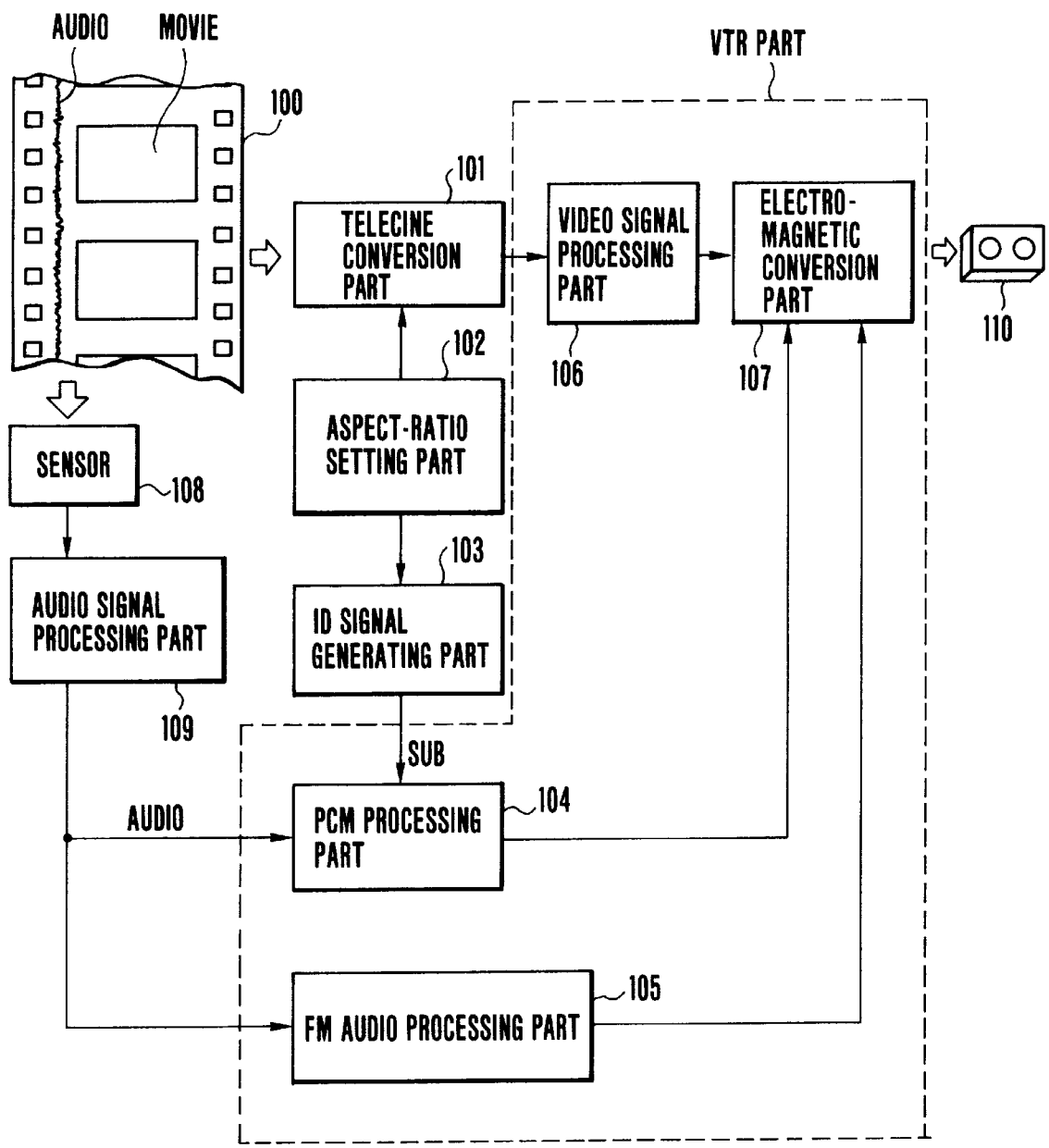
FIG. 26 is a block diagram of a recording system in which aspect-ratio conversion is applied to a telecine system according to a twelfth embodiment of the present invention.

FIG. 26 is a block diagram showing a recording system in which the present invention is applied to a telecine system.

The arrangement shown in FIG. 26 includes a film 100, a telecine conversion part 101, an aspect-ratio setting part 102, an ID signal (such as compression-ratio signal) generating part 103, a PCM processing part 104 in a VTR part, an FM audio processing part 105 in the VTR part, a video signal processing part 106 in the VTR part, an electromagnetic conversion part 107 in the VTR part, a sensor 108, a film audio signal processing part 109, and a VTR tape 110 for recording of signals such as video and audio signals.

The recording and reproduction operations of the apparatus having the above-described arrangement will be described below.

The film 100 may be selected from among, for example, the five representative kinds shown in FIGS. 25(a) to 25(e). Of these kinds, the academy aperture (ID=000) of FIG. 25(a) corresponds to a television signal having an aspect ratio of 4:3 according to the NTSC, PAL or SECAM system, and the 35 mm American standard wide screen (ID=010) of FIG. 25(c) corresponds to the Hi-Vision (HD-TV) proposed by NHK (Nippon Hohsoh Kyokai) having an aspect ratio of 16:9. A desired one of such different film standards is first selected as a video source, and the corresponding aspect ratio, which is set at the aspect ratio setting part 102, is carried to the telecine conversion part 101 and to the ID generating part 103.

In response to the aspect ratio signal, the telecine conversion part 101 sets a horizontal compression ratio electronically or optically, and outputs to the VTR part a television signal having an aspect ratio of 4:3.

The film 100 has a movie picture part and an audio signal recording part which is formed along the movie picture part as a sound track. The audio information recorded on the audio signal recording part is detected by the sensor 108, and the output of the sensor 108 is subjected to predetermined processing such as noise elimination or dynamic-range companding in the audio signal processing part 109. The resultant signal is outputted to the VTR part as an ordinary audio signal.

The data structure provided by PCM processing has a sub-data area in which subsidiary information can be stored, as described previously (refer to FIG. 4). Compression-ratio information outputted from the ID signal generating part 103 is written into the sub-data area.

In this manner, the compressed video signal, a PCM audio signal with which information about the compression of the compressed video signal is combined, and an analog audio signal with which no such information is combined are recorded on the VTR tape 110 by the electromagnetic conversion part (EAM system) 107 in the VTR part.

By the above-described flow, the movie recorded on the movie film 100 is converted into packaged video software.

During reproduction, the ID signal is extracted by a PCM audio reproduction circuit, and an expanded image approximately equivalent to the original image can be reproduced by the arrangement of a reproducing apparatus similar to that used in the first embodiment.

In accordance with each of the above-described embodiments, it is possible to form continuously images of various aspect ratios and to record or reproduce them by means of an image recording and reproducing apparatus which conforms to the existing standard television system (for example, the NTSC system) without the need to greatly change the construction of an imaging apparatus such as an ordinary television camera which conforms to the existing standard television system or the construction of a projection display apparatus such as a projector. In addition, it is possible to display a high-quality image since the effective pixels of an image sensor can be fully utilized.

Further, it is possible to record image software of various aspect ratios and it is also possible to reproduce automatically a recorded image at an appropriate aspect ratio. Accordingly, an apparatus which is extremely easy to handle can be provided.

It can be readily seen that the present invention may be practiced in various other ways without departing from the spirit or essential feature thereof.

In each of the above-described embodiments, a photographed image is compressed or expanded by an optical system to provide an image having a converted aspect ratio and this image is formed as a video signal by imaging, and conversion information on the converted aspect ratio is combined with part of the vertical blanking portion of the video signal. Accordingly, another arrangement may also be employed which, for example, transmits the video signal with which the conversion information is combined, separates the conversion information from this video signal on a receiving side, and reproduces an image on the basis of the conversion information. In other words, although a recording apparatus such as a VTR is provided in each of the embodiments, no such recording apparatus may be provided.

The foregoing description of each of the embodiments is, therefore, solely for the purpose of illustration and is not to be construed as a limiting example.

To the contrary, the present invention is intended to cover various modifications and equivalent arrangements included within the scope of the appended claims or equivalents thereof.

What is claimed is:

1. An image information recording and reproducing system for recording and reproducing image information, comprising:

a) converting means for effecting compression or expansion on an input image and converting the input image into an image having a predetermined aspect ratio, said converting means being able to convert the input images having various kinds of aspect ratios into images having the predetermined aspect ratio, said converting means compressing or expanding the input image by moving an optical system;

b) generating means for generating discrimination information about a position of the optical system moved by said converting means;

c) recording means for recording the discrimination information on a recording medium together with image information of an image having an aspect ratio which has been converted by said converting means;

d) reproducing means for reproducing the discrimination information and the image information from said recording medium; and e) display means arranged to control an optical system on the basis of the discrimination information reproduced by said reproducing means to effect compression/expansion processing on the image information reproduced by said reproducing means and to display the processed image information.

2. An image information processing apparatus according to claim 1, wherein said recording means combines the discrimination information with the image information and records a resultant information.

3. An image information processing apparatus according to claim 1, further comprising sound inputting means for inputting sound, said recording means recording the sound inputted by said sound inputting means in a second area on the recording medium which is different from a first area thereof in which the image information is to be recorded, and recording the discrimination information in the second area.

4. An image information processing apparatus according to claim 1, wherein said converting means is capable of varying a magnification of an image frame only in a particular direction thereof.

5. An image information processing apparatus comprising:
   a) input means for inputting an image signal having a predetermined aspect ratio which is converted from image information by effecting optical compression or expansion on the image information, being a signal of the image information compressed or expanded by moving an optical system, and said input means inputting a discrimination signal about a position of the moved optical system; and
   b) display means arranged to control an optical system on the basis of the discrimination signal, to effect the compression or expansion of the image signal and to display the image signal.

6. An image information processing apparatus according to claim 5, wherein said compression/expansion processing means has a projecting optical system capable of varying a magnification of an image frame only in a particular direction thereof.

7. An image information processing apparatus according to claim 6, wherein the projecting optical system is composed of a cylinder lens system.

8. An image information processing apparatus according to claim 6, wherein the projecting optical system is composed of a prism system.

9. An image information processing apparatus according to claim 5, wherein said display means has a plurality of anamorphic lenses.

10. An image information processing apparatus according to claim 5, wherein said display means compresses or expands the image by digital signal processing.

11. An image information processing apparatus, comprising:
    a) input means for inputting image information;
    b) converting means for converting an aspect ratio of the image information input by said input means by effecting compression or expansion on the image information to convert the aspect ratio, said converting means compressing or expanding the input image by moving an optical system;
    c) generating means for generating discrimination information about a position of the optical system moved by said converting means; and
    d) recording means for recording the discrimination information and the image information converted by said converting means on a recording medium.

12. An apparatus according to claim 11, wherein said input means inputs audio information and said recording means records the audio information on said recording medium.

13. An apparatus according to claim 12, wherein said recording means records the discrimination information on a subdata area in a recording area of the audio information.

14. An apparatus according to claim 11, wherein said converting means has a projecting optical system capable of varying a magnification of an image frame only in a particular direction thereof.

15. An apparatus according to claim 14, wherein the projecting optical system is composed of a cylinder lens system.

16. An apparatus according to claim 14, wherein the projecting optical system is composed of a prism system.

17. An image information processing apparatus, comprising:
    a) input means for inputting an image signal having a predetermined aspect ratio which is converted from image information by effecting optical compression or expansion on the image information, being a signal of the image information compressed or expanded by moving an optical system, and said input means inputting discrimination information about a position of the moved optical system; and
    b) converting means for converting an aspect ratio of the image signal input by said input means by effecting compression or expansion on the image information to convert the aspect ratio on the basis of the discrimination information. —.

18. An apparatus according to claim 17, wherein said input means includes reproducing means for reproducing the image information and the discrimination information from a recording medium on which the image information and the discrimination information are recorded.

19. An apparatus according to claim 17, wherein said converting means has a projecting optical system capable of varying a magnification of an image frame only in a particular direction thereof.

20. An apparatus according to claim 19, wherein the projecting optical system is composed of a cylinder lens system.

21. An apparatus according to claim 19, wherein the projecting optical system is composed of a prism system.

22. A method for processing image information, the method comprising the steps of:
    a) inputting an image signal having a predetermined aspect ratio which is converted from image information by effecting optical compression or expansion on the image information, being a signal of the image information compressed or expanded bymoving an optical system, and said input step inputting a discrimination signal about a position of the moved optical system; and
    b) controlling an optical system on the basis of the discrimination signal to effect the compression or expansion of the image signal and to display the image signal by means of display means.

23. A method for processing image information, the method comprising the steps of:
    a) inputting image information by means of input means, said input means being able to input images having various kinds of aspect ratios as said image information;
    b) converting by means of converting means an aspect ratio of the image information input by said input means by effecting compression or expansion on the image information to convert the aspect ratio, said converting compressing or expanding the input image by moving an optical system;
    c) generating discrimination information about a position of the optical system by said converting means by means of generating means; and d) recording the discrimination information and the image information converted by said converting means on a recording medium by means of recording means.

24. A method for processing image information, the method comprising the steps of:

a) inputting an image signal having a predetermined aspect ratio which is converted from image information by effecting optical compression or expansion on the image information, being a signal of the image information compressed or expanded by moving an optical system, and said input stepmeans inputting discrimination information about a position of the moved optical system; and b) converting by means of converting means an aspect ratio of the image signal in said input step by effecting compression or expansion on the image information to convert the aspect ratio on the basis of the discrimination information.

* * * * *

UNITED STATES PATENT AND TRADEMARK OFFICE
CERTIFICATE OF CORRECTION

PATENT NO.   : 6,188,833 B1
DATED        : February 13, 2001
INVENTOR(S)  : Makino et al.

It is certified that error appears in the above-identified patent and that said Letters Patent is hereby corrected as shown below:

Column 1,
Line 55, delete "by mean s of" and insert -- by means of --.

Column 8,
Line 43, delete "s2 and s2'" and insert -- $s_2$ and $s_2$' --.
Line 51, delete "$e_2$'=$f_3$+$s_2$" and insert -- $e_2$'=$f_3$+$s_2$' --.
Line 57, delete "$h_3/f_3=h_2/s_2$" and insert -- $h_3/f_3=h_2/s_2$' --.

Column 14,
Line 40, delete "prim optical" and insert -- prism optical --.
Line 48, delete "prim optical" and insert -- prism optical --.

Column 15,
Line 38, delete "n1 and $n_2$" and insert -- $n_1$ and $n_2$ --.

Column 16,
Line 49, delete "$\alpha_{21}$ and α22" and insert -- $\alpha_{21}$ and $\alpha_{22}$ --.

Column 21,
Line 56, delete "(EAM system)" and insert -- (E→M system) --.

Column 23,
Line 30, delete "said compression/expansion processing" and insert -- said display --.

Column 24,
Line 45, delete "bymoving" and insert -- by moving --.

UNITED STATES PATENT AND TRADEMARK OFFICE
CERTIFICATE OF CORRECTION

PATENT NO. : 6,188,833 B1
DATED : February 13, 2001
INVENTOR(S) : Makino et al.

It is certified that error appears in the above-identified patent and that said Letters Patent is hereby corrected as shown below:

Column 26,
Line 1, delete "input stepmeans inputting" and insert -- input step inputting --.
Line 5, delete "signal in said" and insert -- signal input in said --.

Signed and Sealed this

Second Day of July, 2002

*Attest:*

*Attesting Officer*

JAMES E. ROGAN
*Director of the United States Patent and Trademark Office*